United States Patent
Hirata et al.

[11] Patent Number: 5,898,657
[45] Date of Patent: Apr. 27, 1999

[54] DISC DRIVING APPARATUS HAVING A BASE MOVING MEANS WITH FIRST AND SECOND ENGAGEMENT SHAFTS ENGAGING RESPECTIVE GROOVES ON A CAM MEMBER

[75] Inventors: Eiichi Hirata, Kanagawa; Mitsuo Ohashi; Satoshi Uwagawa, both of Tokyo, all of Japan

[73] Assignee: Sony Corporation, Tokyo, Japan

[21] Appl. No.: 08/912,432

[22] Filed: Aug. 18, 1997

Related U.S. Application Data

[63] Continuation of application No. 08/520,615, Aug. 30, 1995, abandoned.

[30] Foreign Application Priority Data

Aug. 31, 1994 [JP] Japan .................................. 6-228980

[51] Int. Cl.$^6$ .................................................. G11B 33/02
[52] U.S. Cl. ............................................................. 369/75.2
[58] Field of Search .................................. 369/75.2, 77.2, 369/270, 271; 360/99.05, 99.06, 99.12, 97.03

[56] References Cited

U.S. PATENT DOCUMENTS

| | | | |
|---|---|---|---|
| 4,630,151 | 12/1986 | Okuzawa | 369/270 |
| 4,797,873 | 1/1989 | Nobutani | 369/270 |
| 4,941,140 | 7/1990 | Ono et al. | 369/264 |
| 5,123,004 | 6/1992 | Arai | 369/270 |
| 5,299,185 | 3/1994 | Sakurai et al. | 369/77.2 |
| 5,418,775 | 5/1995 | Okatani | 360/97.03 |

FOREIGN PATENT DOCUMENTS

| | | |
|---|---|---|
| 0 287 101 A2 | 10/1988 | European Pat. Off. . |
| 0 288 289 A2 | 10/1988 | European Pat. Off. . |
| 0 351 032 A2 | 1/1990 | European Pat. Off. . |

Primary Examiner—George J. Letscher
Attorney, Agent, or Firm—Limbach & Limbach L.L.P.

[57] ABSTRACT

A disc driving apparatus has two bases. Both bases swing about their parallel shafts provided at the same side of the bases between positions where the bases chuck a disc-shaped recording medium and positions where they release the medium. A member for rotating the medium is provided for one of the bases, and another member for connecting the medium and the member in order to rotate them together is provided for the other of the bases. The disc driving apparatus also has a pickup for accessing the medium, a chucking mechanism for chucking the medium, a pickup moving mechanism, and a locking mechanism. The pickup can be moved in the radial direction of the medium. The pickup moving mechanism moves the pickup in the radial direction of the medium when the chucking mechanism releases the medium. The locking mechanism locks the movement of the pickup after it is moved to a specified position by the pickup moving mechanism.

12 Claims, 27 Drawing Sheets

DISC DRIVING APPARATUS HAVING A BASE MOVING MEANS WITH FIRST AND SECOND ENGAGEMENT SHAFTS ENGAGING RESPECTIVE GROOVES ON A CAM MEMBER

This is a continuation of application Ser. No. 08/520,615 filed on Aug. 30, 1995 now abandoned.

BACKGROUND OF THE INVENTION

1. Field of the Invention

The present invention relates to disc driving apparatuses.

2. Description of the Related Art

Disc apparatuses including disc driving apparatuses have been used, such as a disc apparatus recording and playing back an optical disc stored in a case. In the disc apparatus, a disc cartridge is first move horizontally to be stored in the cabinet of the disc apparatus the disc cartridge is then lowered to be placed so that the optical disc in the case is placed on a turntable, and then a chucking member is lowered to chuck the disc.

In a disc apparatus for recording and playing back an optical disc which is not stored in a case, an optical disc is first placed on a disc tray, the optical disc is moved horizontally to be stored in the cabinet, a turntable is raised to lift the optical disc from the disc tray, and then a chucking member is lowered perpendicularly to the optical disc from above to chuck the optical disc.

Of the above-described disc apparatuses, the former apparatus needs a mechanism which moves the disc cartridge horizontally and a mechanism which moves the cartridge vertically, making these mechanisms complicated.

The latter apparatus needs a complicated mechanism for moving up and down precisely the turntable and the chucking member to perform precise chucking of an optical disc.

In a disc apparatus, the objective lens of an optical pickup is disposed movably in the radial direction of an optical disc. Usually, the optical pickup is slidably supported at a guide shaft and is moved by a linear motor or other mechanism.

Power to such a disc apparatus may be shut down for some reason during its operation, for example, by an attempt to move the disc apparatus without knowing that it is in operation during a read operation of an optical disc. In such a case, the position of the optical pickup cannot be controlled because the power to the linear motor is turned off, and the optical pickup is left on the guide shaft in the condition in which it can slide freely.

If the disc apparatus is carried in this state, the optical pickup moves, causing damage, such as errors in the precision of optical components precisely assembled and breakage of the optical pickup or members which enable the optical pickup to move freely.

To prevent such damage, the optical pickup can be driven by, for example, a rack and pinion. When the power is shut down, the motor which rotates the pinion is stopped.

With this feature, the optical pickup does not move when the power is shut down. If the optical pickup stops moving at the outer peripheral of the optical disc, however, a new problem may occur. The problem is that the optical disc is scratched when it touches the optical pickup if its outer peripheral is waved due to vibration caused in transportation of the disc apparatus.

Another problem is too long of an access time is required when the optical disc is reloaded and chucked. This is because the position of the optical pickup is not determined, as described above. To describe it precisely, when the position of the optical pickup is not determined within its movement area, the optical pickup must be moved to its reference position before signals are read from or written into the optical disc.

In some disc apparatuses, the shutter of an optical disc is closed while the disc cartridge is being loaded or after it is loaded, and the optical disc is rotated by a turntable.

In such a disc apparatus, an air flow takes place as the optical disc catches the surrounding air when it rotates. Then, air having dust enters the disc apparatus from the front slot used for loading the optical disc or other holes.

Air which enters the disc apparatus may contact an optical disc surface or an objective lens surface of the optical pickup as the above-described air flows, depositing dust on the surfaces.

SUMMARY OF THE INVENTION

Accordingly, it is an object of the present invention to provide a disc driving apparatus which simplifies mechanisms used for moving a disc cartridge horizontally and vertically.

Another object of the present invention is to provide a disc driving apparatus which simplifies a mechanism used for precisely moving a turntable and a chucking member up and down.

Still another object of the present invention is to provide a disc driving apparatus which prevents an optical disc from being scratched by an optical pickup.

Yet another object of the present invention is to provide a disc driving apparatus which has a shorter access time when an optical disc is reloaded and chucked.

A further object of the present invention is to provide a disc driving apparatus which prevents dust from being deposited on an optical pickup and an optical disc.

The above objects of the present invention are achieved through the provision of a disc driving apparatus comprising a first base provided swingably about a first shaft between a first position for releasing a disc-shaped recording medium and a second position for chucking the disc-shaped recording medium; a second base provided swingably between a first position for releasing the disc-shaped recording medium and a second position for chucking the disc-shaped recording medium about a second shaft parallel to the first shaft and provided at the same side as the first shaft; a first member provided for one of the first base and the second base, to which driving power for rotating the disc-shaped recording medium is given; a second member provided for the other one of the first base and the second base for connecting the disc-shaped recording medium and the first member such that the disc-shaped recording medium swings integrally with the first member; and base moving means for moving the first base and the second base between their first and second positions respectively.

The disc driving apparatus of the present invention may further include centering means provided for one of the first member and the second member for centering the disc-shaped recording medium against the first member and the second member, wherein the base moving means moves the first base and the second base such that one of the first base and the second base provided with the centering means reaches its second position from its first position earlier than the other base when the first base and the second base are moved from their first positions to their second positions.

In the disc driving apparatus according to the present invention, the centering means may include a circular member having a taper portion which is engagable with a hole provided at the center of the disc-shaped recording medium.

The disc driving apparatus according to the present invention may have the base moving means comprising a cam member having two grooves; a first engagement shaft provided for the first base for engaging with one of the two grooves on the cam member; and a second engagement shaft provided for the second base for engaging with the other one of the two grooves on the cam member.

In another aspect of the present invention, the foregoing objects are also achieved through the provision of a disc driving apparatus comprising a pickup provided movably in the radial direction of a disc-shaped recording medium for accessing the disc-shaped recording medium; actuating means which is operative in response to the turning off of the power; pickup moving means for moving the pickup in the radial direction of the disc-shaped recording medium according to the operation of the actuating means; and locking means for locking the movement of the pickup which has been moved by the pickup moving means, according to the operation of the actuating means.

The disc driving apparatus according to the present invention may further include a first base provided swingably about a first level shaft between a first position for releasing a disc-shaped recording medium and a second position for chucking the disc-shaped recording medium; a second base provided above the first base and swingably between a first position for releasing the disc-shaped recording medium and a second position for chucking the disc-shaped recording medium about a second shaft parallel to the first shaft and provided at the same side; a first member provided for one of the first base and the second base, to which driving power for rotating the disc-shaped recording medium is given; a second member provided for the other one of the first base and the second base, for connecting the disc-shaped recording medium and the first member such that the disc-shaped recording medium swings integrally with the first member; and base moving means for moving the first base and the second base between their first and second positions respectively, wherein the pickup moving means moves the pickup toward the inner direction of the disc-shaped recording medium according to the operation of the actuating means, and the locking means locks the pickup moving means at the inner side of the disc-shaped recording medium.

In still another aspect of the present invention, the foregoing objects are also achieved through the provision of a disc driving apparatus comprising a pickup provided movably in the radial direction of a disc-shaped recording medium for accessing the disc-shaped recording medium; chucking means for chucking the disc-shaped recording medium; pickup moving means for moving the pickup in the radial direction of the disc-shaped recording medium in interlock with the release of chucking by the chucking means; and locking means for locking the movement of the pickup which has been moved by the pickup moving means according to the operation of the actuating means.

The disc driving apparatus of the present invention may further include a first base provided swingably about a first, level shaft between a first position for releasing a disc-shaped recording medium and a second position for chucking the disc-shaped recording medium; a second base provided above the first base and swingably between a first position for releasing the disc-shaped recording medium and a second position for chucking the disc-shaped recording medium about a second shaft parallel to the first shaft and provided at the same side as the first shaft; and base moving means for moving the first base and the second base between their first and second positions respectively, wherein the chucking means comprises a first member provided for the first base, to which driving power for rotating the disc-shaped recording medium is given; and a second member provided for the second base, for connecting the disc-shaped recording medium and the first member such that the disc-shaped record member swings integrally with the first member, the pickup moving means moves the pickup toward the inner direction of the disc-shaped recording medium according to the operation of the actuating means, and the locking means locks the pickup moving means at the inner side of the disc-shaped recording medium.

The foregoing and other advantageous features of the present invention are explained more fully below and set forth in the appended claims.

BRIEF DESCRIPTION OF THE DRAWINGS

FIG. 5 is an outlined side view illustrating an open condition.

FIG. 16 is a plan showing a condition in which the optical pickup moves freely.

FIG. 23 is a side view showing an open condition.

FIG. 27 is a vertical, longitudinal, central cross section showing an open condition.

DETAILED DESCRIPTION OF THE PREFERRED EMBODIMENT

Figure 1:
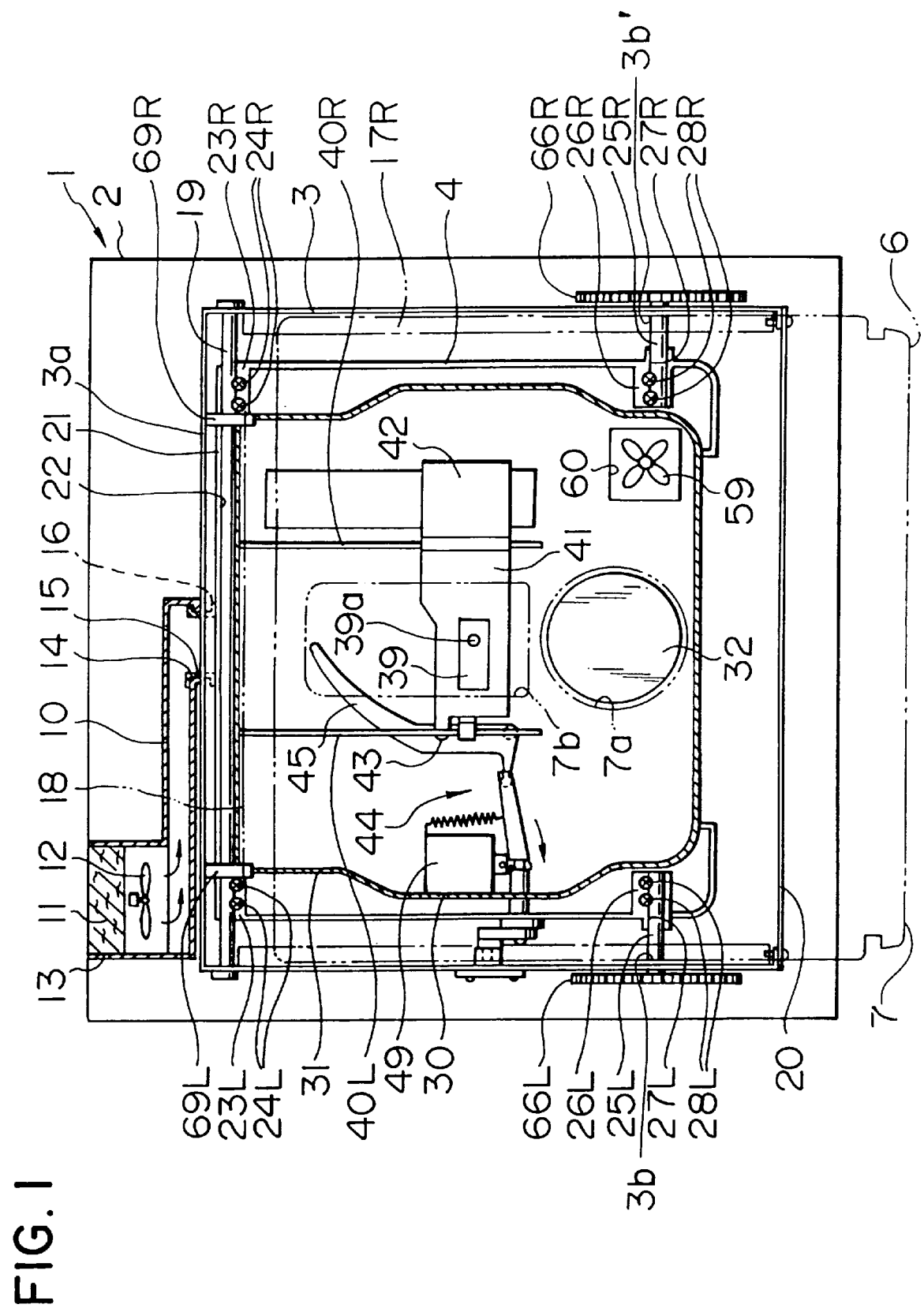
FIG. 1 is a plan showing a disc apparatus according to the present invention with a second base being removed.

A disc player having a disc driving apparatus according to the present invention will be described below in detail by referring to the embodiment shown in the accompanying drawings.

The embodiment shown in the drawings indicates the disc player, to which the present invention applies and which records and plays back an optical disc stored in the cartridge.

In FIG. 1, a disc player 1 comprises a cabinet 2, a chassis 3 which is smaller than the cabinet 2 by one size and has a substantially U-like shape turned sideways and having two sharp corners (hereinafter called a gantry shape), as viewed from above, a first base 4 swingably supported at the rear-end portion of the chassis 3, and a second base 5 disposed above the first base 4 and swingably supported at the rear-end portion of the chassis 3.

The directions used in this specification are determined such that the downward direction in FIG. 1 is the front, the upward direction in FIG. 1 is the rear, the right direction in FIG. 1 is the right, the left direction in FIG. 1 is the left, the side facing the viewer is the top, and the opposite side behind the figure (not shown) is the bottom. These directions are used in the following description.

Before describing the disc player 1, a double-sided-record-type disc cartridge 6 used in the disc player 1 will be described.

Figure 2:
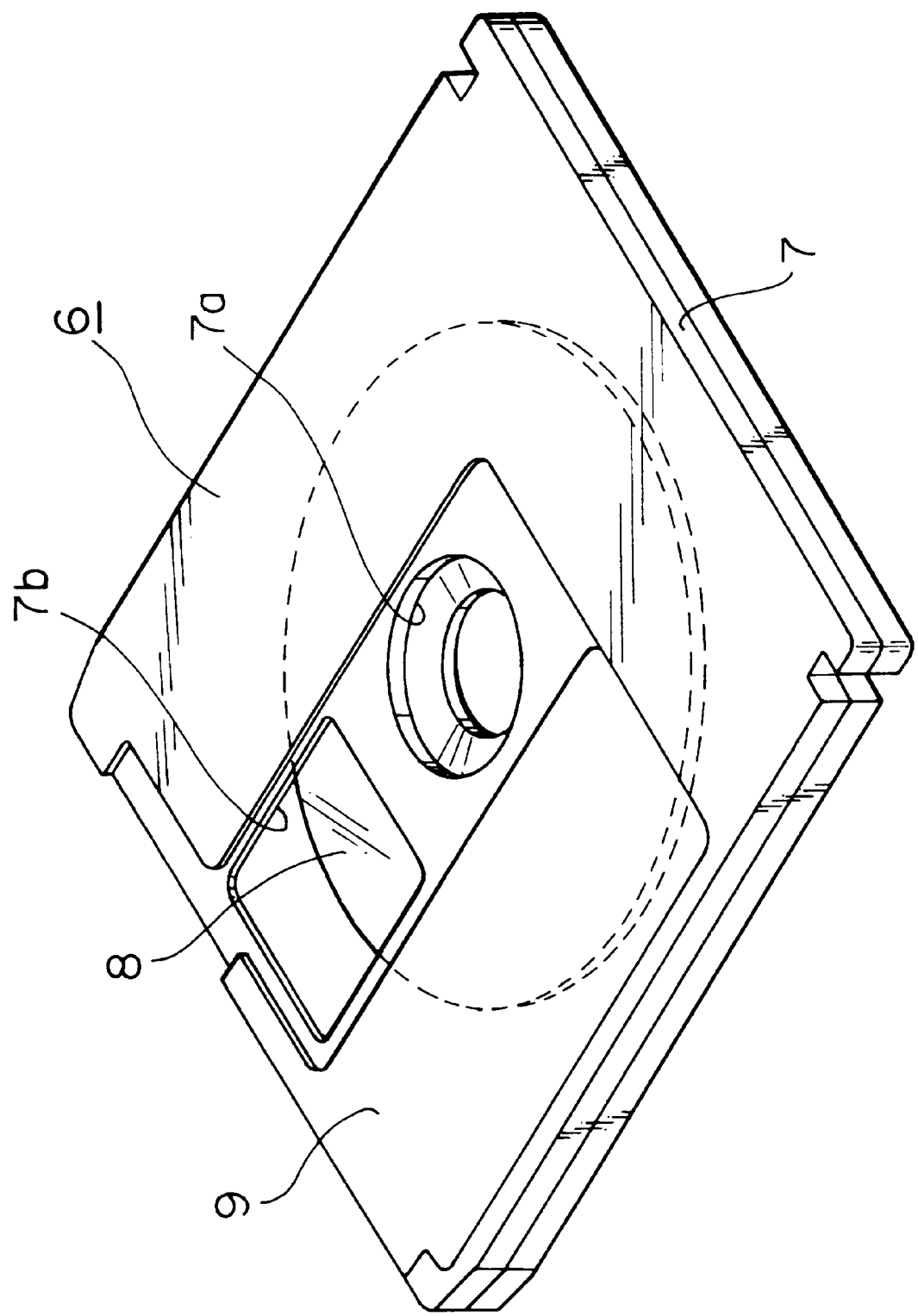
FIG. 2 is a perspective view illustrating a disc cartridge used in the embodiment.

As shown in FIG. 2, the disc cartridge 6 comprises a flat, thin, box-shaped case 7 and an optical disc 8 rotatably stored inside the case 7. Circular turn-table-insertion windows 7a are formed at the center portion on both sides of the case 7, and head-insertion windows 7b are formed at the rear side of the turntable-insertion windows 7a. A shutter 9 moves such that the turntable-insertion windows 7a and the head-insertion windows 7b on the case 7 are set to the open or closed position. When the disc cartridge 6 is loaded into the disc player 1, a shutter opening-and-shutting mechanism not shown in the figure drives the shutter 9 so as to expose the optical disc 8 to the outside through the turn-table insertion windows 7a and the head insertion windows 7b.

Since the cabinet 2 opens at the top and front sides, a top cover and a front panel, both not shown in the figure, cover the upper and front sides of the cabinet, respectively.

A duct 10 provided at the rear wall of the cabinet 2 has a dust-proof filter 11 and a fan 12, and serves as a connection between the inside and outside of the cabinet 2 as shown in FIG. 1.

An air inlet 13 is formed at the left-end portion of the rear wall of the cabinet 2. Inside the air inlet 13, the dust-proof filter 11 and the fan 12 are disposed in such respective order from the air inlet 13. The duct 10 extends almost to the center in the left and right directions inside the rear-end portion of the cabinet 2, and has an air outlet 14 opening to the front, the air outlet 14 being a long oblong hole extending in the left and right directions.

The duct 10 cleans air outside the cabinet 2 and brings such air into the cabinet. It also cools components such as an optical pickup, electronic devices, and the optical disc 8, and prevents dust from floating around the optical pickup and the optical disc 8, as described later.

At the rear wall 3a of the chassis 3, an air inlet 15 having almost the same cross section as the air outlet 14 of the duct 10 is formed such that it opposes the air outlet 14. The air inlet 15 is equipped with a connection pipe 16 made of elastic materials, such as rubber, which extends to the rear side from the edges of the air inlet 15 such that the air inlet 15 connects to the air outlet 14 when the chassis 3 is installed on the cabinet 2.

Air taken into the duct 10 by the fan 12 from the air inlet 13 of the cabinet 2 is first cleaned with the dust-proof filter 11, flows in the duct 10, and then flows into the chassis 3 from the air inlet 15 through the air outlet 14 of the duct 10 and the connection pipe 16, as shown in FIG. 1.

Figure 3:
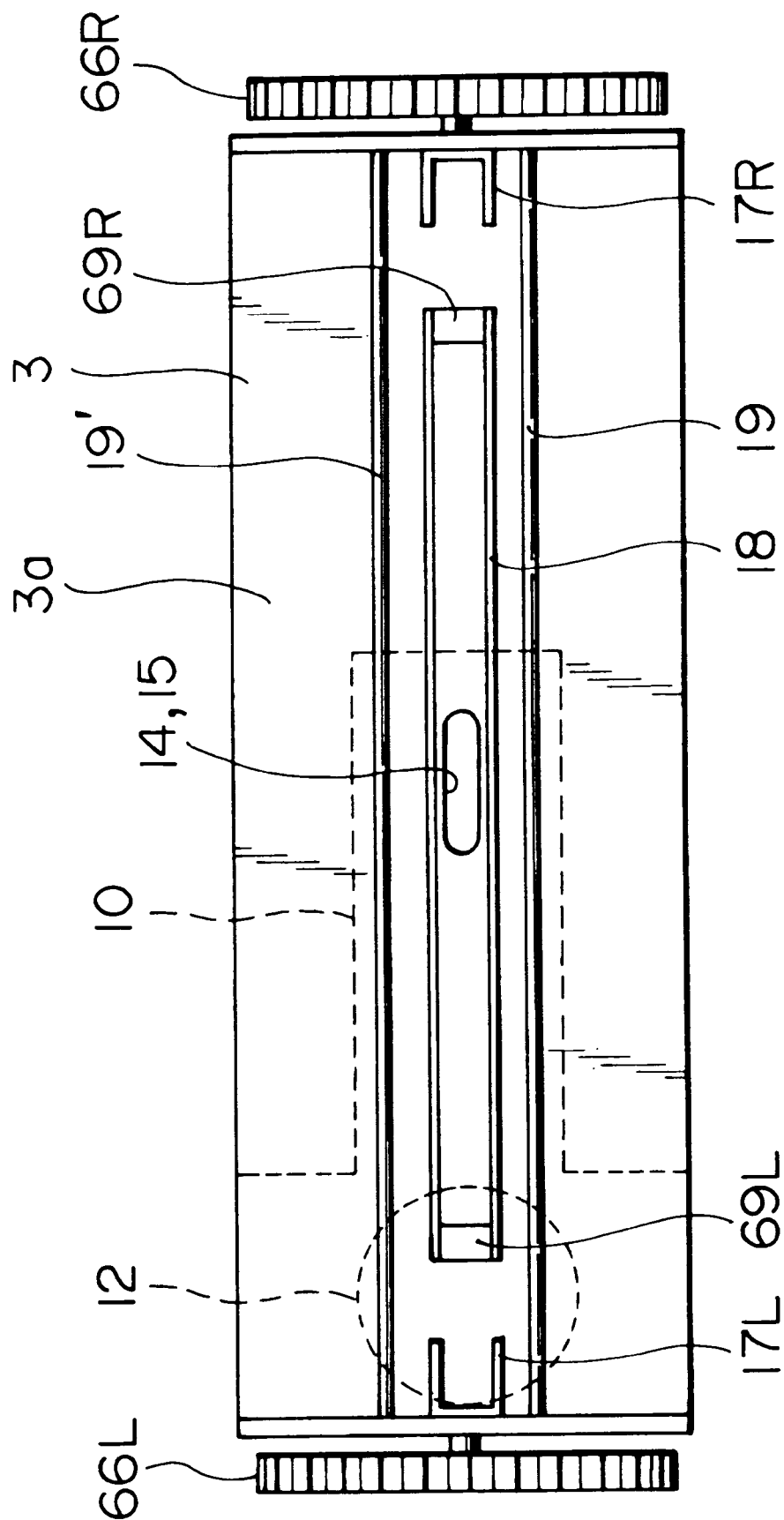
FIG. 3 is an elevation illustrating a chassis without bases.

Guides 17L and 17R having a gantry-shaped cross section for guiding the disc cartridge 6 being loaded and for holding the disc cartridge 6 in the chassis 3 have two opposing walls with a distance nearly equal to or slightly larger than the thickness of the case 7 of the disc cartridge 6, as shown in FIG. 3. The guides 17L and 17R are disposed at the inside of the left and right side walls of the chassis 3 such that they open toward the inside of the chassis 3, they are level, and they extend to almost all of the left and right side walls at a height of the air inlet 15. The disc cartridge 6 is loaded into the chassis 3 so that the left and right side edges of the disc cartridge 6 are guided by the guides 17L and 17R and the rear edge of the cartridge 6 is inserted to the proximity of the rear end of the chassis 3.

At the inside of the rear wall 3a of the chassis 3, a frame member 18 having almost the same cross section as the guides 17L and 17R is mounted such that it opens towards the inside of the chassis 3 at the same height as the guides 17L and 17R.

A hole having almost the same shape as the air inlet 15 is formed at a portion of the frame member 18, opposite to the air inlet 15 of the rear wall 3a, so as not to prevent air from flowing into the chassis 3 from the duct 10.

Figure 4:
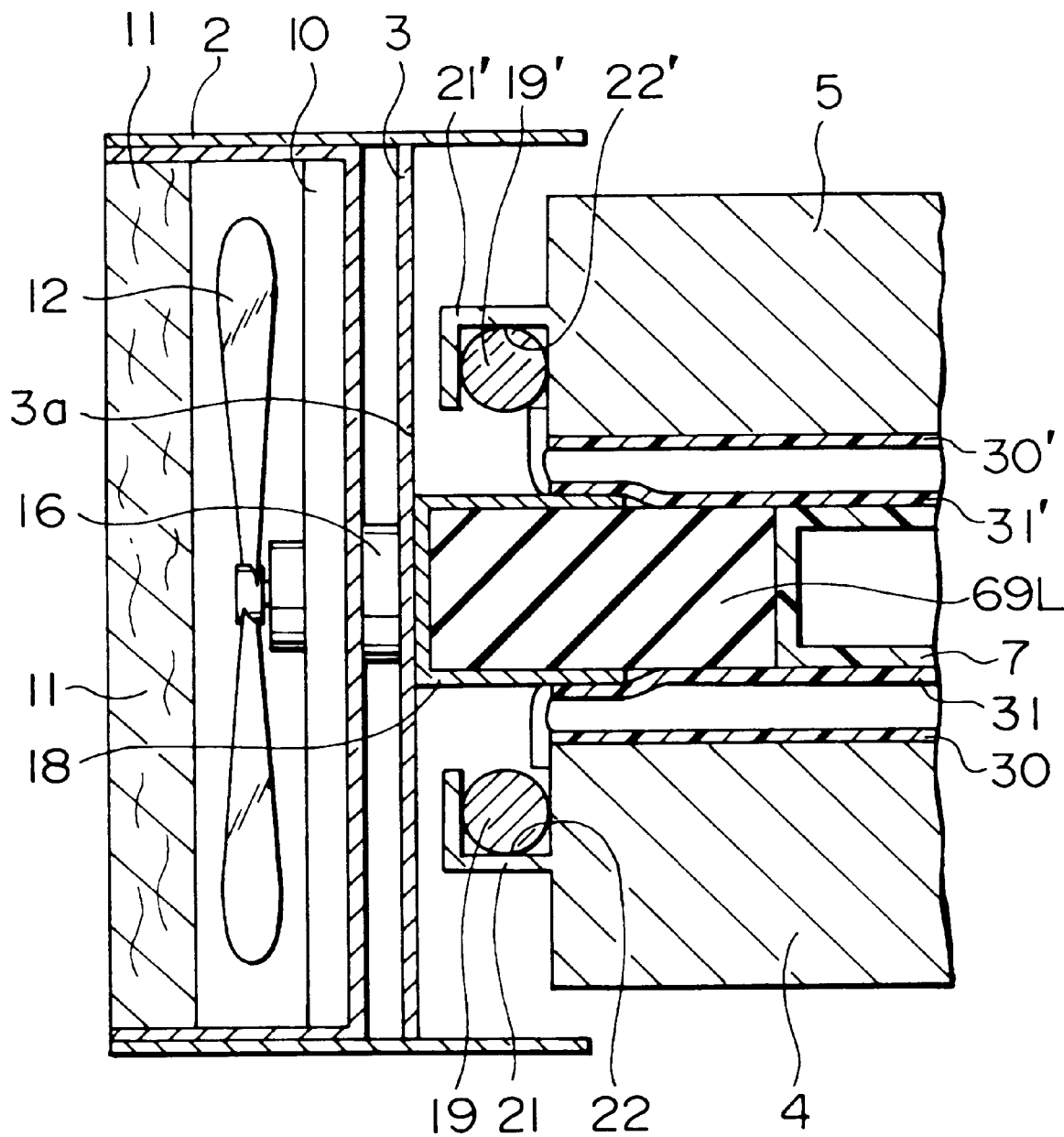
FIG. 4 is an enlarged cross section showing the rear portion of the disc apparatus.

Shafts 19 and 19' spanning the space between the left and right side walls of the chassis 3 are disposed near the rear wall 3a of the chassis 3 such that they are slightly distant from the frame member 18 in the upper and lower directions respectively, as shown in FIGS. 3 and 4.

A reinforcement member 20 spanning the space between the front-end portions of the left and right side walls of the chassis 3 is disposed lower than the guides 17L and 17R, as shown in FIG. 1.

The first base 4 generally has the same shape as the second base 5. They differ only in that the first base 4 is provided with a turntable 32 whereas the second base 5 is provided with a chucking member 61. Therefore, the first base 4 will mainly be described below and only the chucking member 61 will be described for the second base 5. For other portions in the second base 5, reference symbols given to the corresponding portions in the first base 4 are indicated with a single quotation mark in figures, and their descriptions will be omitted.

The first base 4 is like a thin box opening upwards. On the outside surface of the rear wall of the first base 4, a hook portion 21 having an L-shape cross section is formed throughout the rear wall in the left and right directions, forming a catch groove 22 which opens upwards, as shown in FIG. 4. The catch groove 22 has a certain size such that it engages with the shaft 19 without play.

At the left and right ends of the rear wall of the first base 4, thick wall portions 23L and 23R are formed which protrude toward the inside as shown in FIG. 1. Two screw holes are formed near the rear edge of each of the thick wall portions 23L and 23R, and separately in the left and right directions. The two screw holes extend in the upward and downward directions and open upward.

The hook portion 21 is hooked from below on the lower shaft 19 supported by the chassis 3 so as to position the shaft 19 in the catch groove 22. Then, screws 24L and 24R are screwed into the screw holes on the thick wall portions 23L and 23R so that the lower surfaces of the heads of the screws 24L and 24R press the shaft 19 to the inside surface of the catch groove 22. Hence, the first base 4 is rotatably supported at the rear end portion of the chassis 3.

Engagement shafts 25L and 25R protruding toward the outside at the front portions of the left and right side walls of the first base 4 are secured to mounting portions 26L and 26R formed at the left and right end portions of the front of the first base 4, as shown in FIG. 1. The mounting portions 26L and 26R are formed as follows. Cube-shaped blocks are formed integrally at the inside surfaces of the front portions of the left and right side walls. On each block, an engagement shaft groove 27L, 27R which opens upward is formed through the left-side wall and the right-side wall, respectively. Two screw holes extending vertically and being open upward are also formed separately in the left and right directions. Their positions are slightly back from the center lines of the engagement shaft groove 27L, 27R. The engagement shafts 25L and 25R are fit in the engagement shaft grooves 27L and 27R with one end of one of the shafts protruding from the left side wall of the first base 4 and one end of the other shaft protruding from the right side wall. Screws 28L and 28R are screwed into the screw holes so that the engagement shafts 25L and 25R are pressed by the lower surfaces of the heads of the screws 28L and 28R to the inside surfaces of the engagement shaft grooves 27L and 27R. This means that the engagement shafts 25L and 25R are secured to the engagement shaft grooves 27L and 27R of the mounting portions 26L and 26R.

Figure 5:
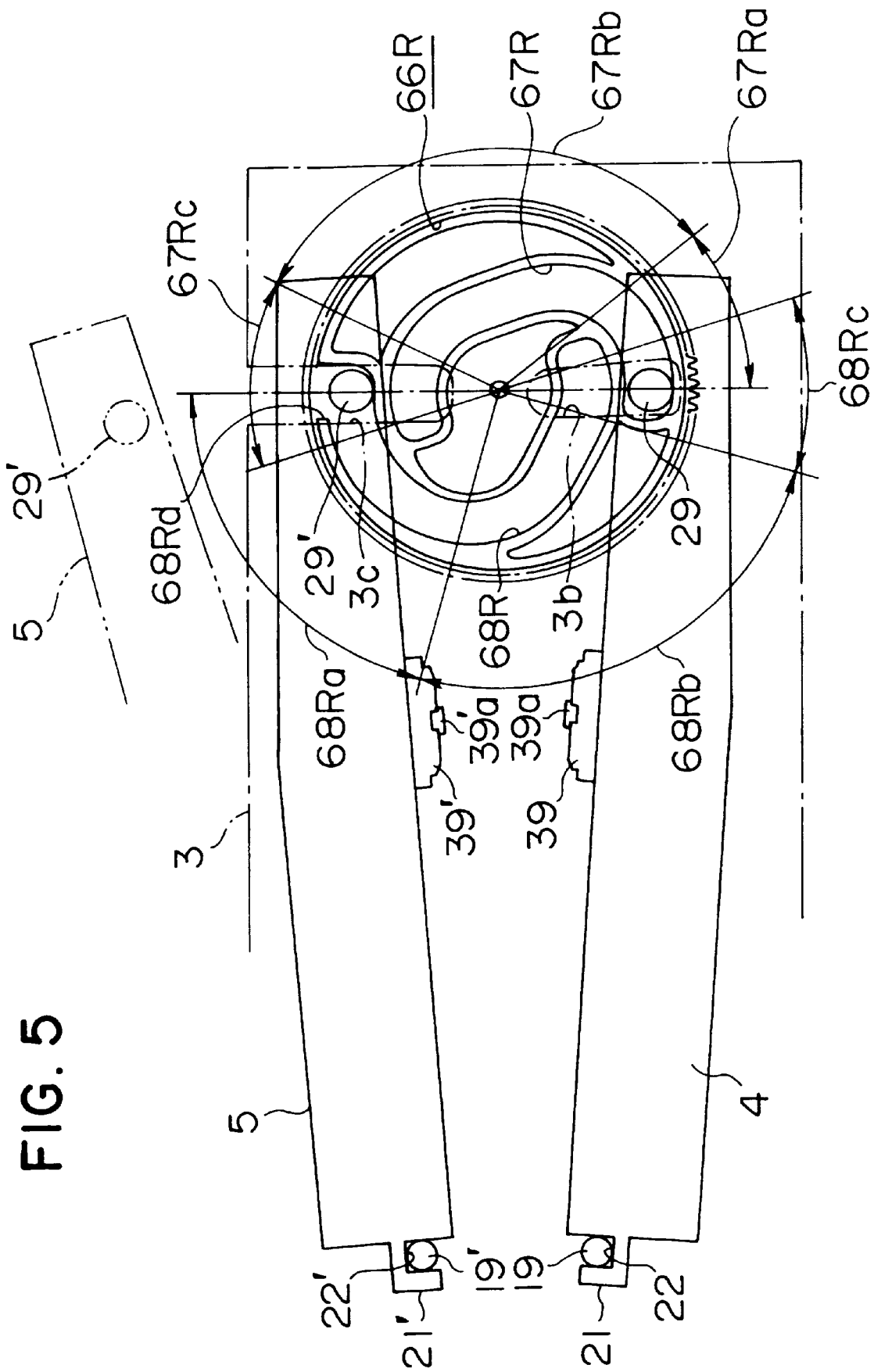
FIG. 5, along with FIGS. 6 to 9, shows the outlined relationship between a cam gear and two bases.

Insertion holes 3b and 3b' are formed on both side walls of the chassis 3 at the positions corresponding to the engagement shafts 25L and 25R. When the first base 4 is supported by the chassis 3, the tip portions of the engagement shafts 25L and 25R protrude outside from the chassis 3. The insertion holes 3b and 3b' are formed at a certain size such that they do not prevent the engagement shafts 25L and 25R from moving as the first base 4 swings against the chassis 3. At the positions corresponding to the engagement shafts 25L' and 25R' on the second base 5, insertion notches 3c and 3c', which correspond to the insertion holes 3b and 3b', are formed such that they open upward at the upper edge of the chassis 3, as shown in FIG. 5.

Ball bearings 29 and 29' are mounted at the tip portions of the engagement shafts 25R and 25L protruding outside from the side walls of the chassis 3. The ball bearings 29 and 29' are fit in the cam grooves of a cam gear described later.

An inner wall 30 standing upright from the bottom plate at slightly inside the left and right side walls of the first base 4 is connected to the front and rear walls of the first base 4 with the wall 30 and the front wall, excluding its left and right ends, being connected in an R shape as viewed from above so as not to have sharp edges, as shown in FIG. 1.

Figure 12:
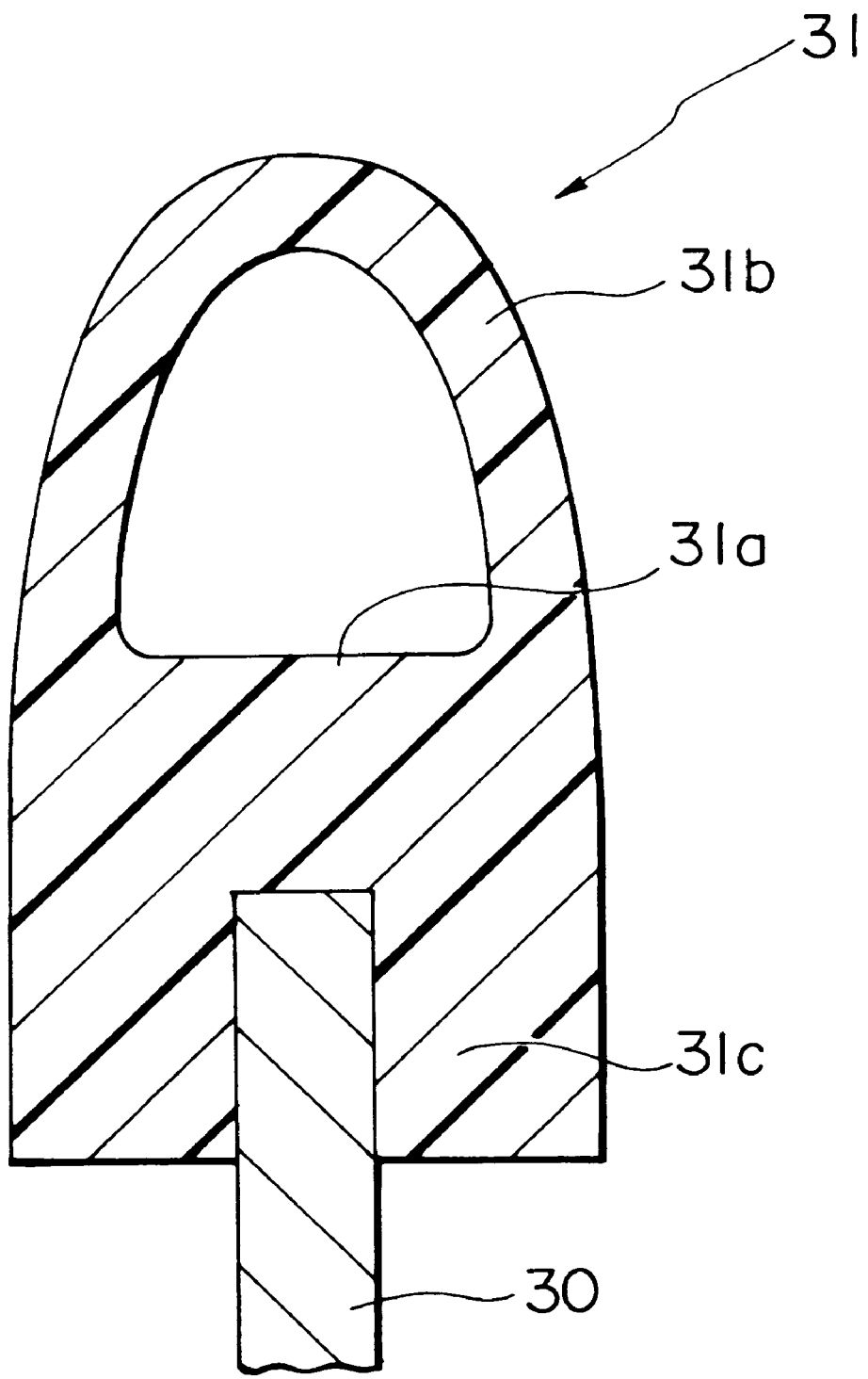
FIG. 12 is an enlarged cross section of a sealing member.

As best seen in FIGS. 4 and 12, a sealing member 31 is fit on the upper edges of the inner wall 30, the center portions of the rear wall and the front wall of the first base 4. The sealing member 31 is marked with diagonal lines in FIG. 1. As shown in FIG. 12, the sealing member 31 has a generally U-shaped cross section. It comprises an isolation wall 31a formed at the center, a tubular sealing portion 31b disposed at the bottom side, and a gantry-shaped fitting portion 31c disposed at the opening side. The fitting portion 31c is fit on the upper edges of the inner wall 30 and the center portions of the front and rear walls of the first base 4. When the first base 4 is in the chucking state, the sealing member 31 fit on the wall 30 and the center portion of the front wall butts against the lower surface of the disc cartridge 6 and the sealing portion 31b is slightly crushed.

Figure 13:
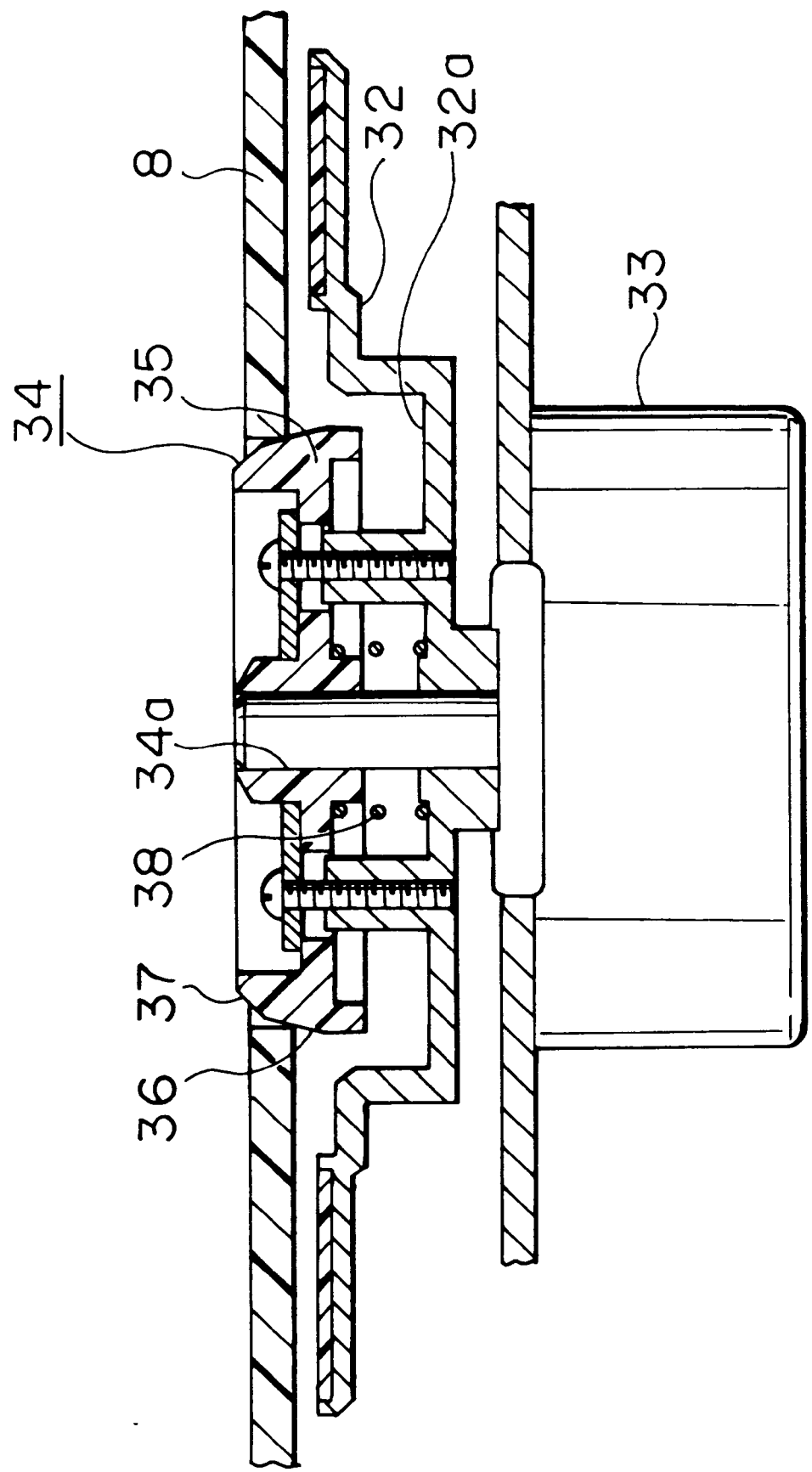
FIG. 13 is an enlarged, vertical, longitudinal cross section of a turntable.
Figure 14:
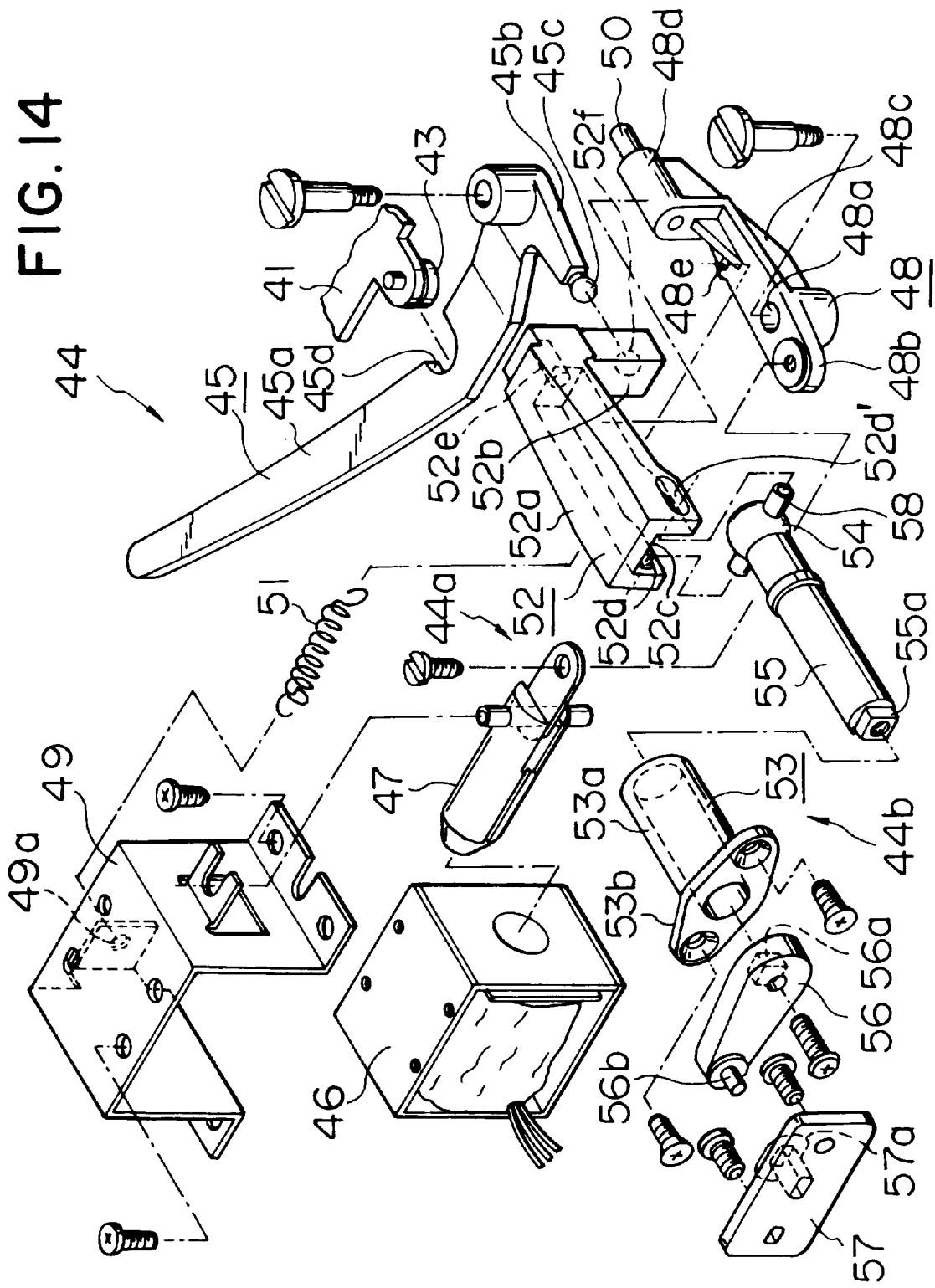
FIG. 14 is an exploded perspective view illustrating an optical pickup return mechanism.
Figure 15:
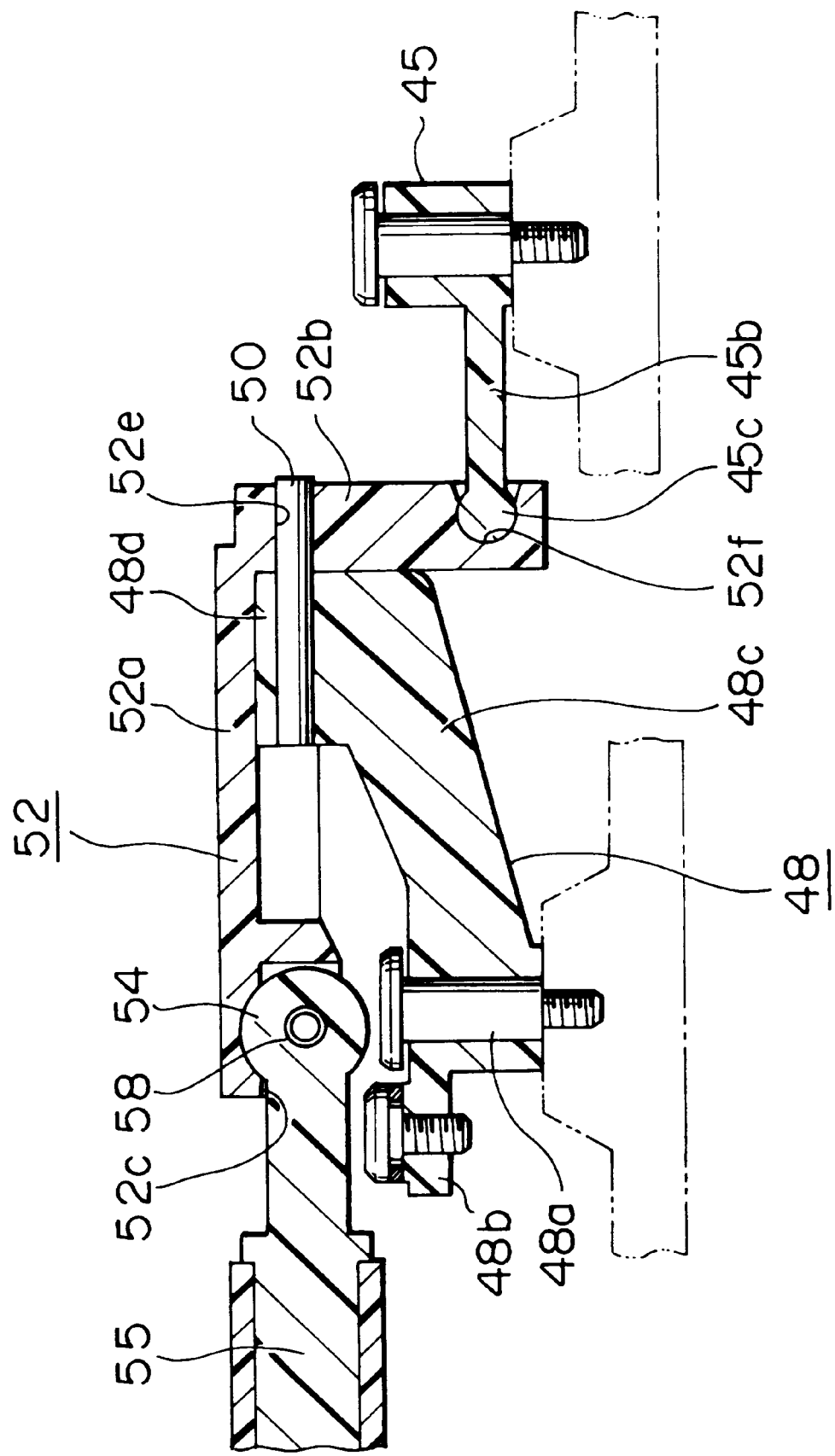
FIG. 15 is an enlarged cross section showing the main part of the optical pickup return mechanism.

A turntable 32 is disposed at the center of the left and right directions in the front portion of the first base 4, and is mounted on the output shaft of a spindle motor 33 protruding upwards, as shown in FIG. 13.

A depressed portion 32a which opens upwards is formed at the center of the turntable 32. A centering guide 34 is mounted on the depressed portion 32a, is secured so as to not come off in the upward direction, and is supported by the turntable 32.

The centering guide 34 is nearly a circular plate having a ring-shaped standing wall 35 at its outer peripheral edge. At the center in the upward and downward directions in the outer surface of the standing wall 35, a taper surface 36 inclining inside toward the top of the wall is formed. A taper-shaped guide surface 37 inclining further inside toward the top of the wall than the taper surface 36 is formed from the upper end of the taper surface 36 to the top. The taper surface 36 and the guide surface 37 are buffed so as to easily perform centering of the optical disc 8 when the disc cartridge 6 is chucked.

A center hole 34a having a diameter slightly larger than that of the output shaft of the spindle motor 33 is formed at the center portion of the centering guide 34. Since the center hole 34a is fit onto the output shaft of the spindle motor 33, the centering guide 34 can be moved axially against the output shaft of the spindle motor 33.

A coil spring 38 is loaded between the turntable 32 and the centering guide 34. The centering guide 34 is always urged in the direction away from the turntable 32, namely upwards, by the coil spring 38. When the centering guide is not pressed downwards, most of the taper surface 36 is positioned above the upper surface of the turntable 32.

The centering guide is used as a mechanism for centering an optical disc in this embodiment. The present invention does not exclusively use this mechanism. Any mechanism centering an optical disc when the optical disc is placed on a turntable can be used.

As shown in FIG. 1, an optical pickup 39 is disposed at a place nearer to the rear of the base than that of the turntable 32. The optical pickup 39 is placed on a moving table 41 which is slidably supported by two guide rails 40L and 40R. The objective lens 39a of the optical pickup 39 is set such that it moves radially with respect to the rotation center of the turntable 32.

The optical pickup 39 is driven by a linear motor 42 disposed at the outside of the guide rail 40R.

A ball bearing 43 is rotatably supported at the opposite side of the linear motor 42 on the moving table 41 for the optical pickup 39 such that the rotation shaft of the ball bearing 43 extends in the upward and downward directions. The ball bearing 43 is pressed by the return lever 45 of an optical pickup return mechanism 44, described next.

The optical pickup return mechanism 44 moves the optical pickup 39 to the innermost position of its movement area in respective mode, that is, to the nearest position to the turntable 32. The optical pickup return mechanism 44 comprising a plunger, arm, link, lever, and other components is disposed at the position at the side of the optical pickup 39 to which the optical pickup 39 is moved when nearest to the turntable 32, as shown in FIGS. 1, 14, 15, and 16.

The above-mentioned mode occurs either when the power is shut down for some reason, or when the first base 4 is swung against the chassis 3 from the condition in which the optical disc 8 is chucked. These two modes will be described below.

The optical pickup return mechanism 44 has two systems for actuating mechanisms 44a and 44b for these two modes. In either actuating mechanism, the return lever 45 is operated at its back end to press the ball bearing 43 of the moving table 41 for the optical pickup 39 so as to move the optical pickup 39.

Referring to FIGS. 14–17, the actuating mechanism 44a, which operates in one of the above-mentioned two modes, is disposed in front of a plunger 46 secured to the bottom surface of the first base 4 and a moving iron core 47 of the plunger 46, and comprises the return lever 45, and a rocking member 48 swingably supported at the bottom surface of the first base 4.

A securing member 49 for securing the plunger 46 to the first base 4 has a gantry-shaped cross section to cover the plunger 46 from above. The plunger 46 is covered with the securing member 49 and screwed to the member 49. The securing member 49 is screwed to the first base 4. Thus, the plunger 46 is secured to the first base 4.

The plunger 46 is disposed slightly to the rear of the turntable 32 of the first base 4 in the left-end portion.

A spring hook piece 49a protrudes to the left of the rear-end portion of the securing member 49.

The rocking member 48 extends in the left and right directions. A rocking fulcrum 48a is located slightly left from the center of the rocking member 48 in the longitudinal direction. The left-end portion 48b, which is the nearest of the two end portions to the rocking fulcrum 48a, is connected to the tip portion of the moving iron core 47.

A cylinder-shaped portion 48d extending in the longitudinal direction of the rocking member 48 protrudes from the upper surface of the right-end portion 48c of the rocking member 48. An engagement pin 50 is secured to the cylinder-shaped portion 48d such that the pin protrudes from the tip surface of the portion.

A spring hook hole 48e is formed at the position nearer to the right end than the rocking fulcrum 48a of the rocking member 48.

A coil spring 51 is stretched between the spring hook piece 49a of the securing member 49 and the spring hook hole on the rocking member 48. The rocking member 48 is always urged counterclockwise, as viewed from above, by this coil spring 51.

A head-shaking member 52 when viewed from the front is shaped as an "L" turned sideways. The long arm 52a is level in the left and right directions, and the short arm 52b is disposed such that it is plumb with the right end of the long arm 52a. At the lower surface of the long arm 52a, a groove 52c having a gantry-shaped cross section is formed.

On walls opposing each other at the left end of the long arm 52a of the head-shaking member 52, long oblong holes 52d and 52d' are formed in the longitudinal direction.

An insertion hole 52e penetrating the short arm 52b in its left and right directions near the crooked portion of the short arm 52b of the head-shaking member 52 is formed. At the right surface of the tip portion of the short arm 52b, a dented portion 52f is formed.

The cylinder-shaped portion 48d of the rocking member 48 is positioned in the groove 52c of the long arm 52a of the head-shaking member 52, and the engagement pin 50 of the rocking member 48 is inserted into the insertion hole 52e of the short arm 52b. Thus, the head-shaking member 52 is connected to the rocking member 48 so that the head-shaking member 52 swings about the engagement pin 50 of the rocking member 48.

The return lever 45 has an almost L-shaped figure. Its crooked portion is swingably supported on the bottom surface of the first base 4 below the end portion, which is close to the turntable 32, of the guide rail 40L located at the opposite side of the linear motor 42. The long arm 45a extends almost backward to the rear portion of the movement area of the moving table 41, and the short arm 45b extends to the side opposite the linear motor 42.

The long arm 45a of the return lever 45 bends outside (toward the center of the guide rails 40L and 40R) as it goes backward. A spherical element 45c is integrally formed at the tip portion of the short arm 45b.

A U-shaped notch 45d is formed at a position close to the fulcrum from the center portion of the long arm 45a of the return lever 45 such that it opens toward the outside (toward the optical pickup 39). The U-shaped notch 45d has a size large enough for fitting the ball bearing 43 mounted on the moving table 41 for the optical pickup 39 into the notch from the side.

The spherical element 45c formed on the short arm 45b of the return lever 45 is fit in the dented portion 52f of the head-shaking member 52. The return lever 45 is connected to the plunger 46 through the head-shaking member 52, the rocking member 48, and the moving iron core 47. Thus, the actuating mechanism 44a, which forms one system, is configured.

Figure 16:
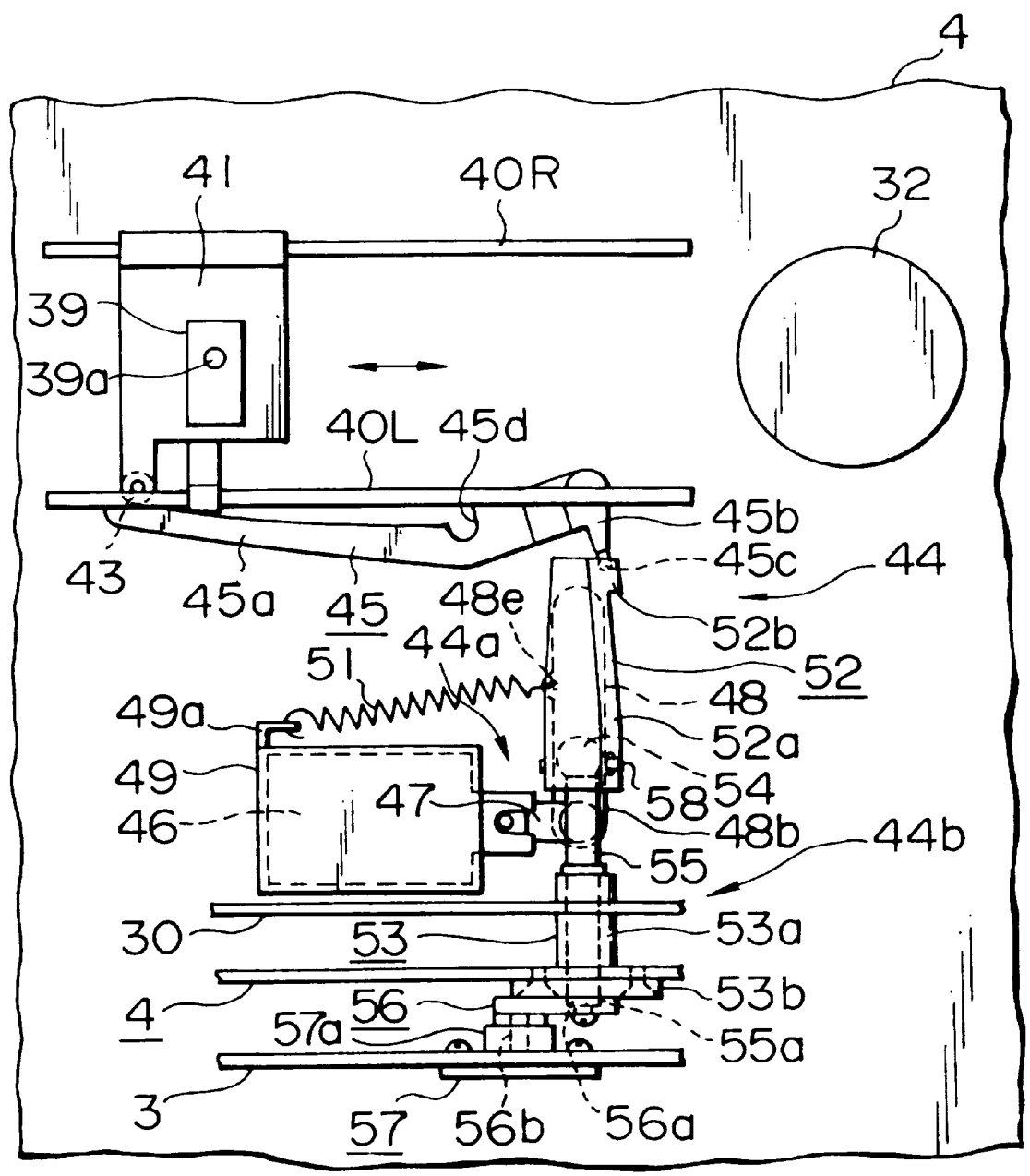
FIG. 16, along with FIGS. 17 to 21, explains the operation of the optical pickup return mechanism.

While power is applied to the plunger 46, the moving iron core 47 is drawn into the plunger 46, swinging the rocking member 48 clockwise, as viewed from above, against the pulling force of the coil spring 51. The short arm 52b of the head-shaking member 52 is moved forward, swinging the return lever 45 connected to the head-shaking member 52 counterclockwise, as viewed from above. Then, the return lever 45 is retained at the condition as shown in FIG. 16.

In this condition, since the ball bearing 43 of the moving table 41 for the optical pickup 39 does not touch the return lever 45, the optical pickup 39 and the moving table 41 move freely within their movement areas along the guide rails 40L and 40R without their movement being prevented by the return lever 45.

Figure 17:
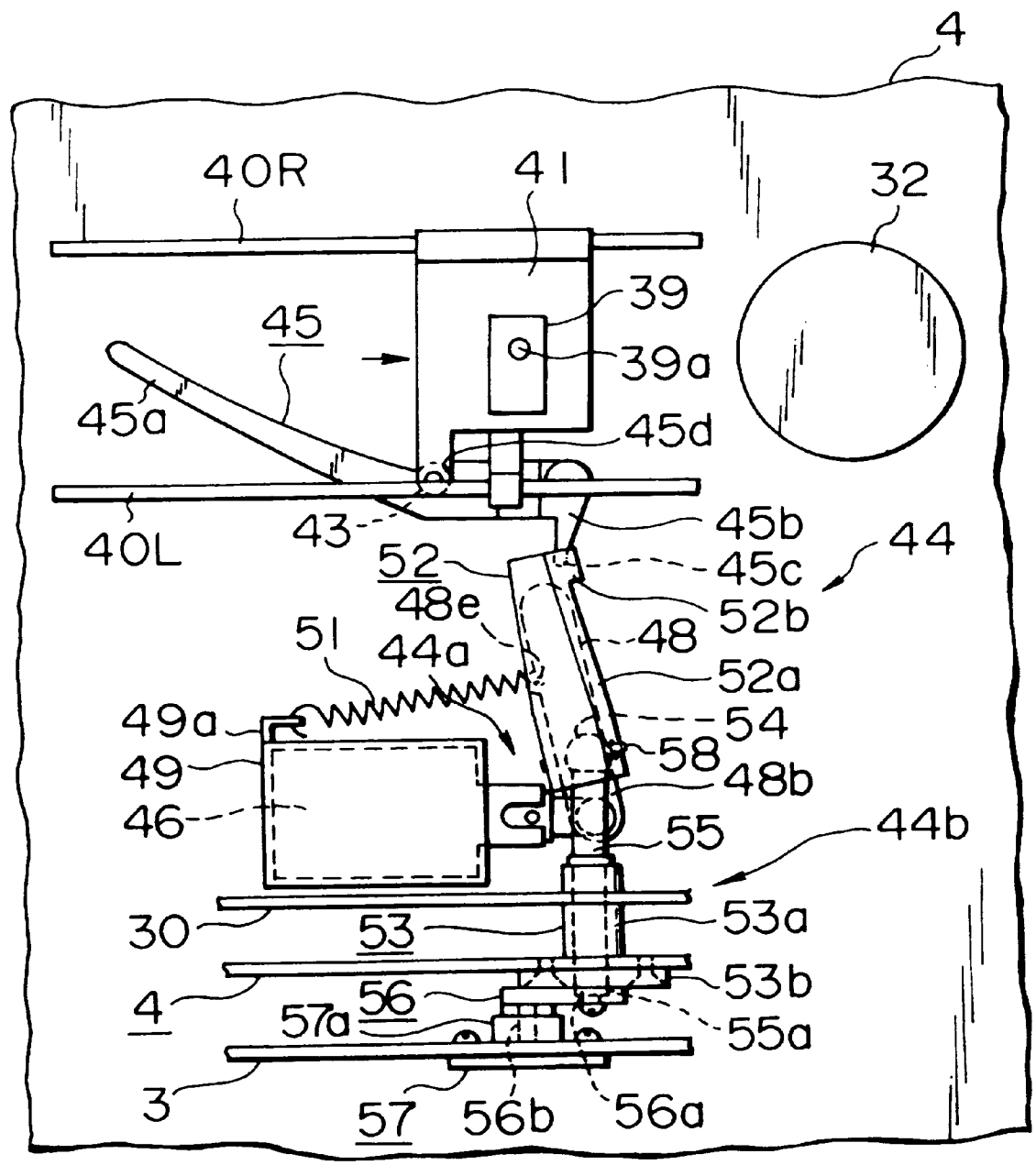
FIG. 17 is a plan showing a condition in which the optical pickup is moved to the turntable side when power to a plunger is shut down.

While the disc player 1 is operating, such as during a read operation of the optical disc 8, if the power to the disc player 1 is shut off due to some reason, for example, due to erroneous operation, the power to the plunger 46 is shut off, the rocking member 48 is swung counterclockwise due to the pulling force of the coil spring 51, and the return lever 45 is swung clockwise. Then, the moving table 41 for the optical pickup 39 is moved forward so that the optical pickup 39 is moved to the front end portion of its movement area, as shown in FIG. 17.

The above movement can be described as follows: When the power to the plunger 46 is shut off, the moving iron core 47 becomes freely movable within the plunger 46, and the rocking member 48 is swung counterclockwise due to the pulling force of the coil spring 51 applied to the rocking member 48. The tip portion of the moving iron core 47 retracts out of the plunger 46, and the short arm 52b of the head-shaking member 52 is moved backward. Then, the spherical element 45c of the return lever 45, which is fit in the dented portion 52f of the head-shaking member 52, is moved backward and the return lever 45 is swung clockwise. The return lever 45 swung clockwise touches the ball bearing 43 of the moving table 41 from the left rear and presses it, moving the moving table 41 forward. The ball bearing 43 of the moving table 41 is fit in the U-shaped notch 45d of the return lever 45 when the moving table is moved forward, preventing the return lever 45 from swinging and the moving table 41 from moving. The moving table 41 and the optical pickup 39 are in the lock condition.

With this operation, if the power is erroneously shut off during an operation, such as a read operation of the optical disc 8, the optical pickup 39 is positioned at the position closest to the turntable 32, preventing the optical disc 8 from touching the optical pickup 39.

With a relatively large (for example, 12 inches in diameter) optical disc 8, if some vibration (such as that caused by movement of the disc player 1) is applied to the disc player 1 when the optical pickup 39 is positioned near the outer peripheral of the optical disc 8, the outer peripheral of the optical disc may be so substantially waved that it touches the optical pickup 39.

Previously, there has occurred a contact accident between the optical pickup 39 and the optical disc 8. When the power was turned off to move the disc player 1 without knowing that the optical disc 8 was being chucked, vibration occurred in the disc player 1, the outer peripheral of the optical disc 8 being chucked was substantially waved, and then the optical disc 8 touched the optical pickup 39 positioned at the outer peripheral of the optical disc 8. Since the above-described optical pickup return mechanism 44 moves the optical pickup 39 toward the center of the optical disc 8, namely, toward the turntable 32, and keeps the position of the optical pickup in the lock condition, preventing it from moving, such it contact accident is prevented.

When a small optical disc 8 is used, because it is just slightly eccentric, the optical pickup may be moved to the position where it first accesses the disc at power on.

It is not required to provide any mechanism for securing the optical pickup 39 during transportation, such as screwing down the optical pickup when the disc player 1 is shipped from the factory, because the optical pickup 39 can be locked at the front-end portion of its movement area.

The actuating mechanism 44b, which operates in the other of the above-described two modes, comprises a cylinder-shaped shaft-receiving member 53 secured to a side wall of the first base 4, a shaft member 55 on which a spherical element 54 is integrally formed at one tip portion and which is rotatably supported by the shaft-receiving member 53, an operated member 56 mounted at the other tip portion of the shaft member 55 against the spherical element 54, an operating member 57 for operating the operated member 56, the head-shaking member 52 connected to the shaft member 55 at the side of the spherical element 54, and the return lever 45 connected to the head-shaking member 52, as shown in FIGS. 14, 15, 18, and 19.

In the shaft-receiving member 53, a flange portion 53b is formed at one tip portion of a cylinder-shaped portion 53a. The cylinder-shaped portion 53a is inserted into an insertion hole formed at the left-side wall of the first base 4 from outside, and then the flange portion 53b is screwed to the left-side wall from outside. The shaft-receiving member 53 configured as described above is disposed at the left of the head-shaking member 52.

At the end face of the shaft member 55 opposite the spherical element 54, a square-column portion 55a having a short length in the axial direction protrudes. A threaded hole is formed on an end face of the square-column portion 55a.

The shaft member 55 is inserted into the cylinder-shaped portion 53a of the shaft-receiving member 53 from the right with its square-column portion 55a being inserted first, and the square-column portion 55a protrudes from the flange portion 53b of the shaft-receiving member 53.

A through hole passing through the spherical element 54 is formed in the direction perpendicular to the axial line of the shaft member 55.

The operated member 56, which is made of a plate member, has a square-dented portion 56a having a cross section almost equal to or slightly larger than that of the square-column portion 55a of the shaft member 55 at one end portion of one surface (right surface), and a threaded insertion hole passing through the operated member 56 at the bottom surface of the square-dented portion 56a. The operated member 56 also has an integrally protruded operation pin 56b at one end of the other surface (left surface), which is formed as a unit.

The square-column portion 55a of the shaft member 55, which protrudes to the left from the flange portion 53b of the shaft-receiving member 53, is fit in the square-dented portion 56a of the operated member 56 such that the square-column portion 55a cannot rotate, and a screw is inserted from left into the screw insertion hole so that it is screwed into the threaded hole of the square-column portion 55a.

With this configuration, the shaft member 55 is rotated together with the operated member 56 when the member 56 is rotated with the operation pin 56b thereof.

The spherical element 54 of the shaft member 55 is fit in the left-end portion of the groove 52c of the long arm 52a of the head-shaking member 52, and a pin 58 is inserted into one oblong hole 52d of the head-shaking member 52, the through hole of the spherical member 54, and the other oblong hole 52d' in such order. The pin 58 has almost the same length as the width of the long arm 52a of the head-shaking member 52. The pin 58 is inserted into the through hole of the spherical element 54 with pressure. With this configuration, the head-shaking member 52 and the shaft member 55 are connected like a universal joint.

The operating member 57 is an almost rectangular plate member and has a cylinder-shaped engagement portion 57a formed integrally with the operating member 57 at the center of one surface (right surface). The engagement portion 57a has a center hole having a cross section of a long oblong hole in the forward and backward directions.

The operating member 57 is screwed to the left-side wall of the chassis 3. When the first base 4 is installed into the chassis 3, the operation pin 56b of the operated member 56 is inserted into the center hole of the engagement portion 57a of the operating member 57.

Like the actuating mechanism 44a, which is the other system described above, the actuating mechanism 44b forms one system as follows: the spherical element 45c of the short arm 45b of the return lever 45 is fit in the dented portion 52e of the head-shaking member 52. The return lever 45 is connected to the operated member 56 through the head-shaking member 52 and the shaft member 55. The operation pin 56b of the operated member 56 is inserted into the center hole of the engagement portion 57a of the operating member 57.

When the operated member 56 is rotated in the upward and downward directions with the operation pin 56b (as viewed in FIGS. 8 and 20), the shaft member 55 is rotated accordingly. Through the pin 58 press-fitted into the spherical element 54, the head-shaking member 52 is with a rotation axis being the line connecting the center of the spherical element 54 of the shaft member 55 and the insertion hole 52e of the head-shaking member 52 into which the engagement pin 50 of the rocking member 48 is inserted. Then, the dented portion 52f at the lower-end portion of the short arm 52b is moved in the forward and backward directions.

Accordingly, the spherical element 45c of the short arm 45b of the return lever 45, which is connected to the dented portion 52f of the short arm 52b of the head-shaking member 52, is moved in the forward and backward directions, swinging the return lever 45.

The actuating mechanism 44b in this mode operates as the operated member 56 and the operating member 57 move relatively in the upward and downward directions.

The relative movement between the operated member 56 and the operating member 57 in the upward and downward directions is caused when the first base 4 is swung against the chassis 3 because the operating member 57 is secured to the chassis 3 and the members other than the operating member 57 in this mode (the operated member 56, shaft-receiving member 53, shaft member 55, head-shaking member 52, and return lever 45) are supported by the first base 4.

Figure 18:
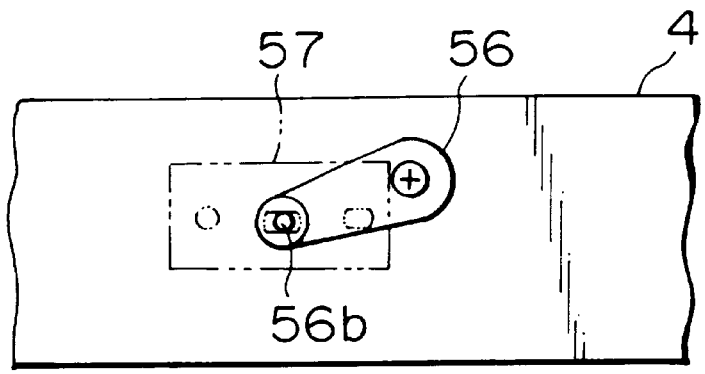
FIG. 18 is a side view illustrating an operated member when the bases are in the chucking condition.
Figure 19:
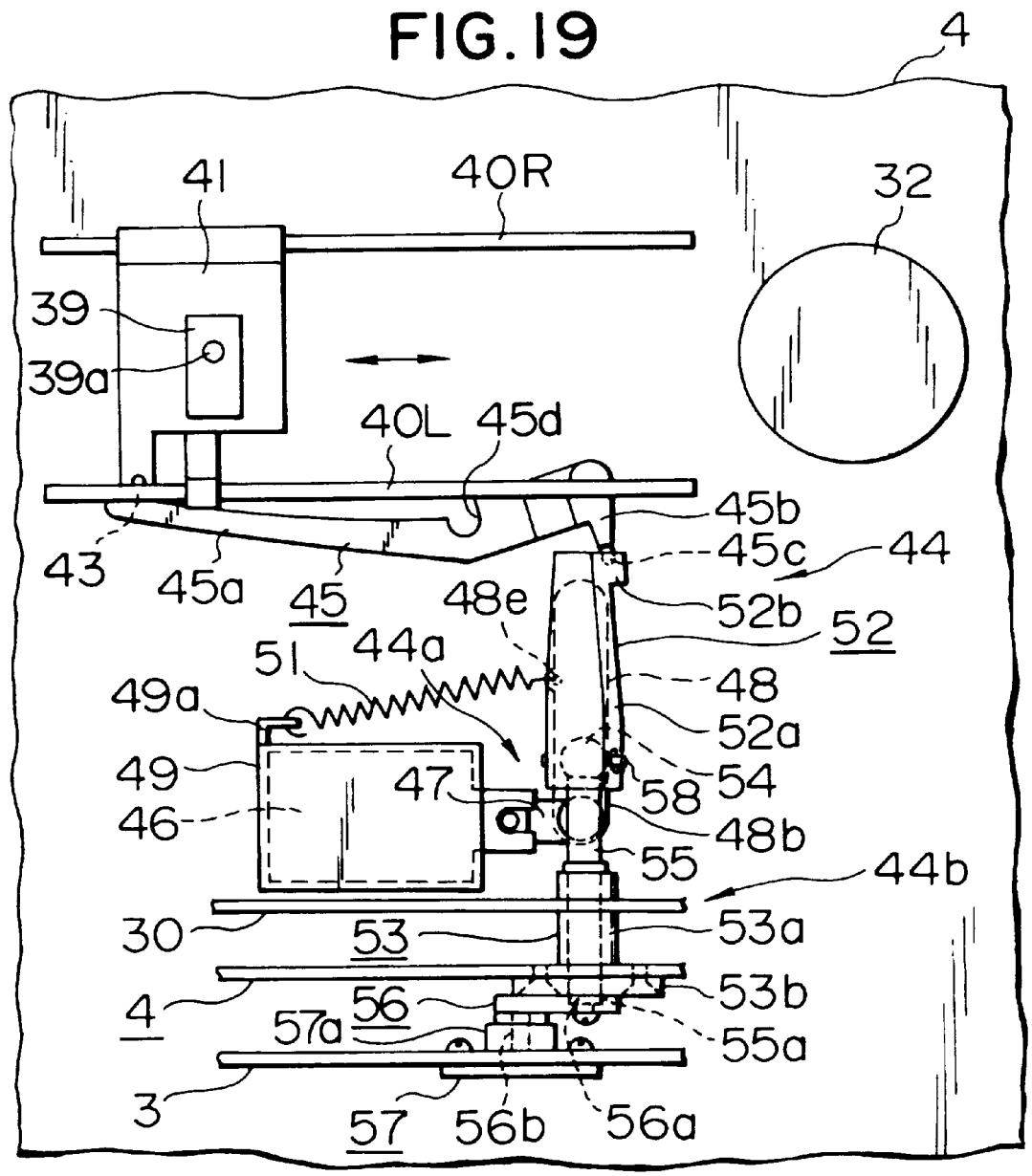
FIG. 19 is a plan view showing the condition illustrated in FIG. 18.

Details will be described below. While the optical disc 8, described later, is being chucked, when the operating member 57 is positioned relatively lower than the swing center (axial line of the shaft member 55) of the operated member 56 as shown in FIG. 18, the shaft member 55 and the head-shaking member 52 are both swung counterclockwise, as viewed from the left. This means that the dented portion 52f of the short arm 52b of the head-shaking member 52 is positioned forward, and the return lever 45, connected to the head-shaking member 52, is rotated counterclockwise, as viewed from above, and retained at that position, as shown in FIG. 19.

This condition is the same as that caused when the power is applied to the plunger 46 in the actuating mechanism 44a of the other system. The ball bearing 43 of the moving table 41 for the optical pickup 39 does not touch the return lever 45. Therefore, the optical pickup 39 and the moving table 41 can move freely throughout their movement areas along the guide rails 40L and 40R without their movement being prevented by the return lever 45.

Figure 20:
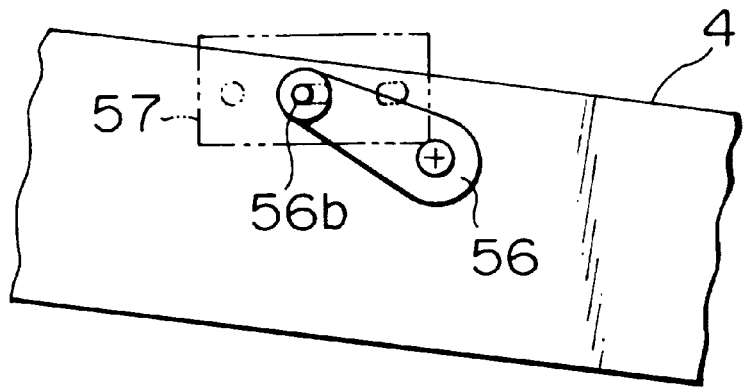
FIG. 20 is a side view illustrating the operated member when the bases are in an open condition.
Figure 21:
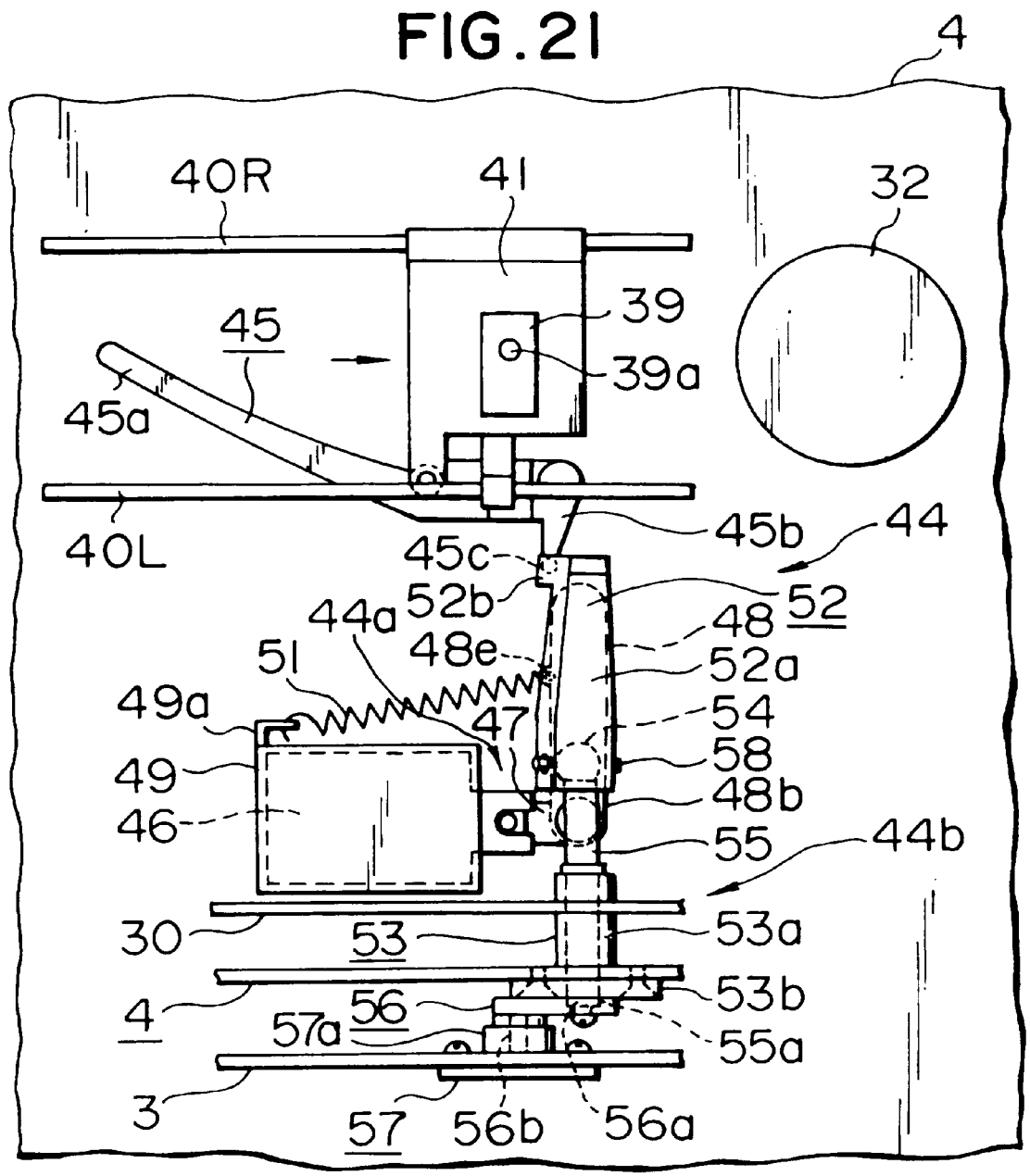
FIG. 21 is a plan view showing the condition illustrated in FIG. 20.

When the first base 4 is swung against the chassis 3 in the disc player 1 from the condition in which the optical disc 8 is chucked, the operating member 57 is moved to the position relatively higher than that of the swing center (axial line of the shaft member 55) of the operated member 56, as shown in FIG. 20. In this condition, the shaft member 55 and the head-shaking member 52 are both swung clockwise, as viewed from the left. This means that the dented portion 52f of the short arm 52b of the head-shaking member 52 is moved backward, and the return lever 45 is rotated clockwise, as viewed from above as shown in FIG. 21.

When the return lever 45 is swung clockwise, the moving table 41 for the optical pickup 39 is moved forward. This means that the optical pickup 39 is moved to the front-end portion of its movement area.

With this operation, when the first base 4 is swung from the condition in which the optical disc 8 is chucked, the optical pickup 39 is always moved to the position near the turntable 32. When the optical disc 8 is chucked the next time, the optical pickup 39 has already been located at the position near the turntable 32. This means that the optical pickup can be returned to the position referred to as the reference point.

In the above-described two actuating mechanisms 44a and 44b, since some members, such as the head-shaking member 52 and the return lever 42, are used in common, the number of components used for each mechanism operating independently in each mode is reduced and the mechanisms are simplified.

Figure 10:
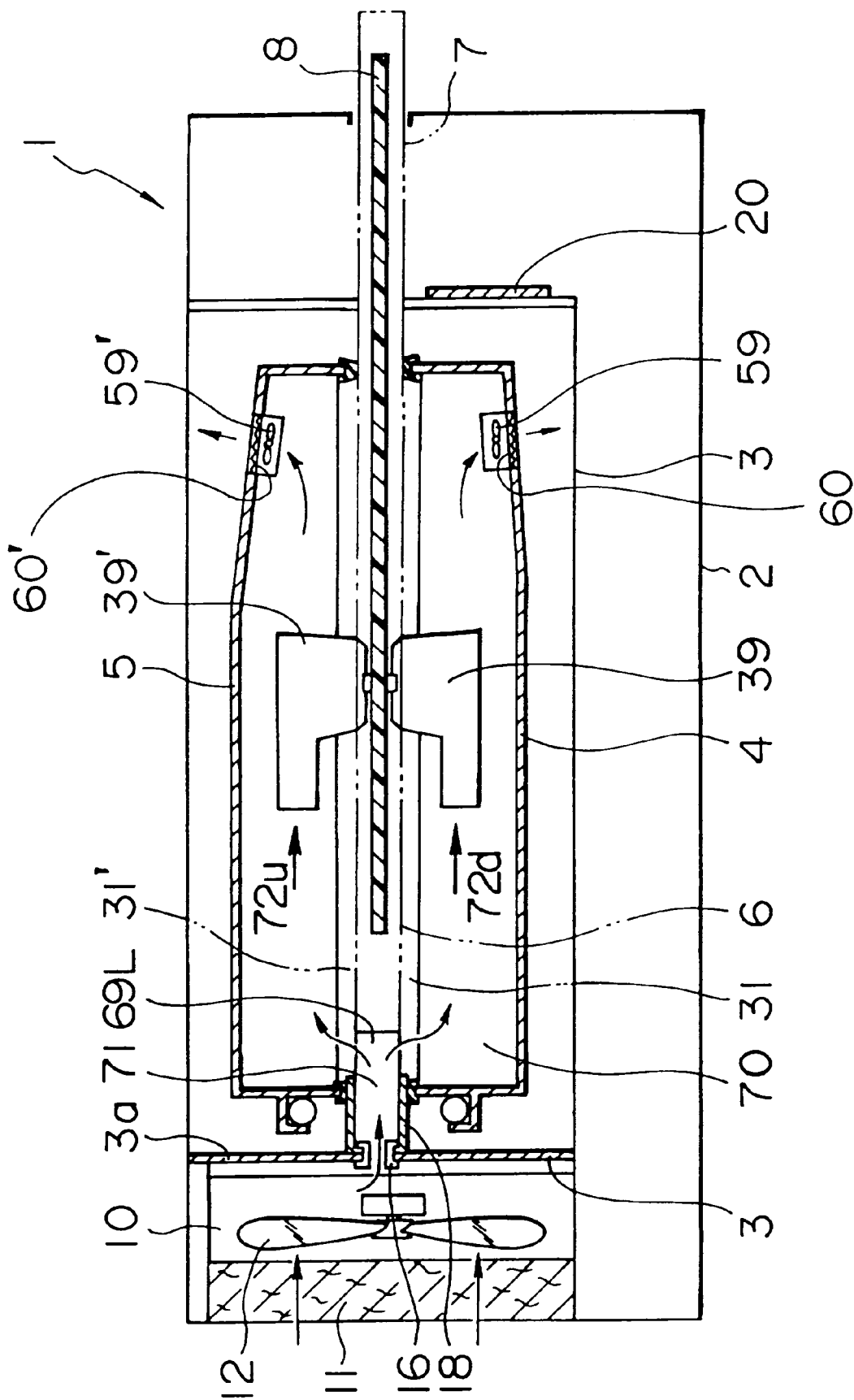
FIG. 10 is a vertical, longitudinal, central cross section showing the disc apparatus in the chucking condition.
Figure 11:
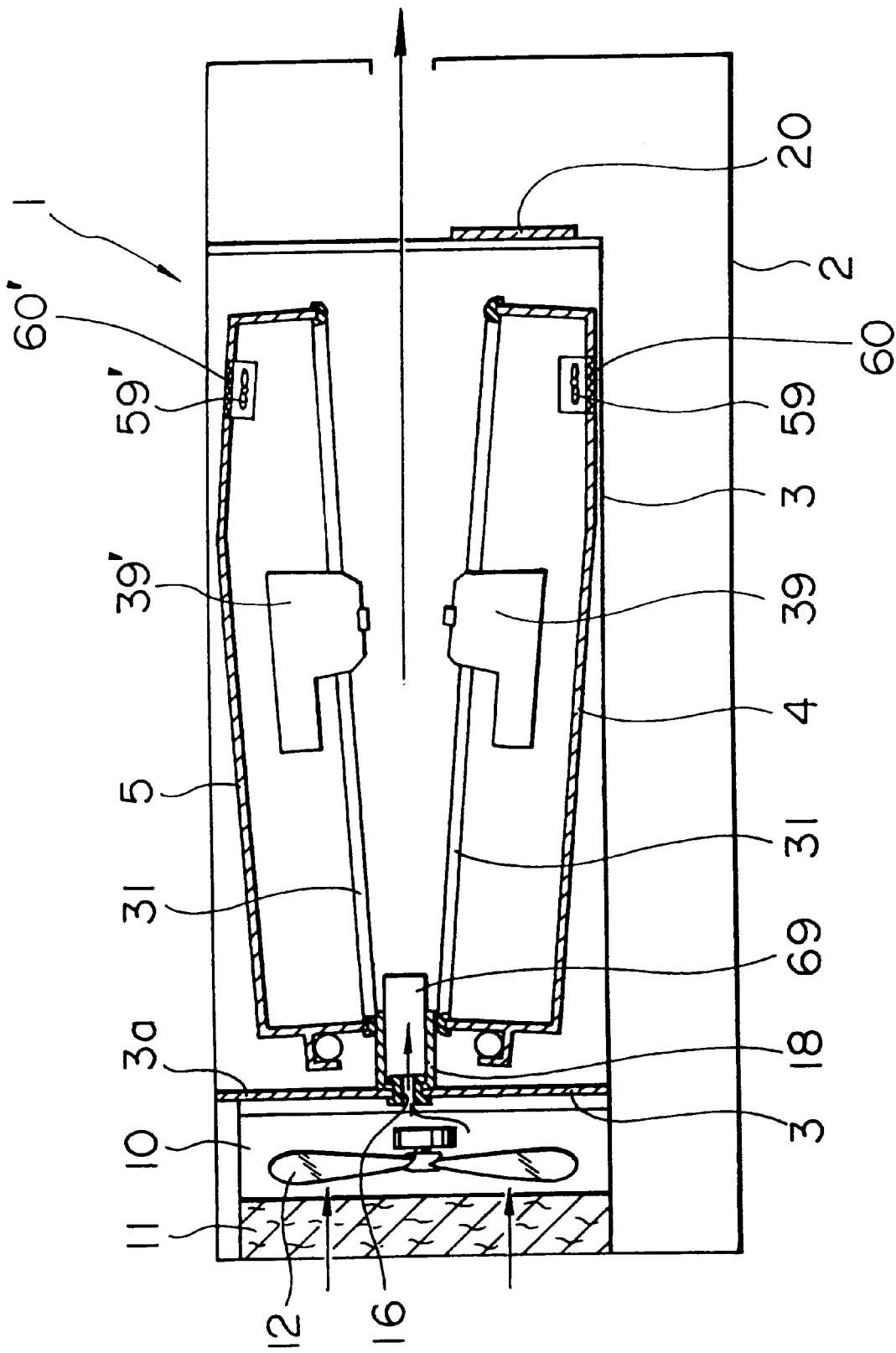
FIG. 11 is a vertical, longitudinal, central cross section showing the disc apparatus in an open condition.

A fan 59 is disposed at a ventilation window 60 formed at the bottom surface in the front portion of the first base 4. The fan 59 exhausts air inside the first base 4 to the outside of the first base 4, as shown in FIGS. 1, 10, and 11.

Figure 22:
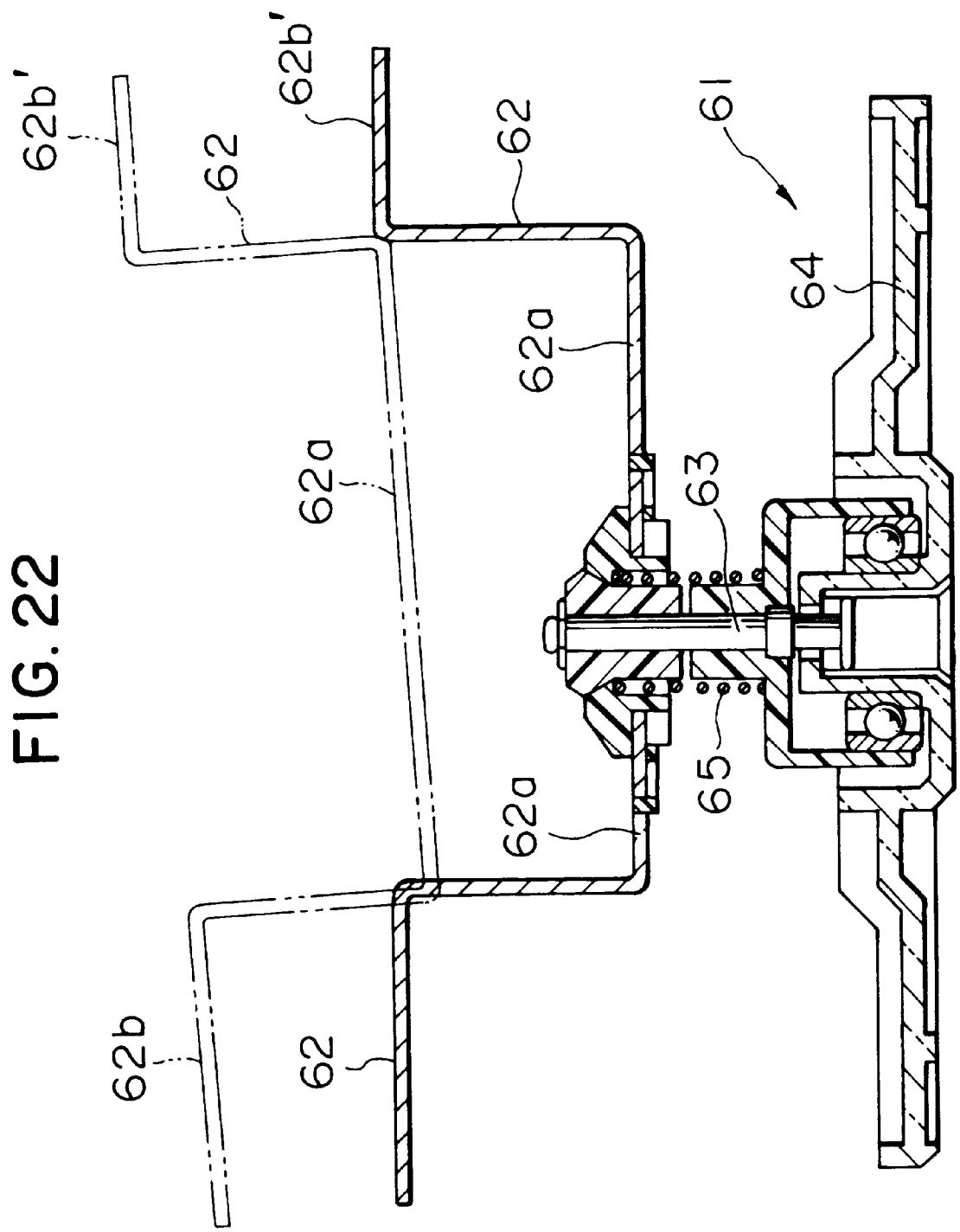
FIG. 22 is an enlarged, vertical, longitudinal cross section of a chucking member.

The second base 5 differs from the first base 4 in that, as described above, the second base 5 is provided with a chucking member 61 shown in FIG. 22, instead of the turntable 32.

The chucking member 61 comprises a mounting member 62 mounted on the bottom surface of the second base 5, a support shaft 63 rockably supported at the mounting member 62, a circular plate member 64 rotatably supported at the lower-end portion of the support shaft 63 through a ball bearing, and a coil spring 65 loaded between the tip portion of the support shaft 63 and the mounting member 62.

A crimp-type chucking mechanism will be described in this embodiment. The present invention does not limit the use of other mechanisms. A magnet-type chucking mechanism may be used.

The mounting member 62 comprises a main portion 62a with a cross section having almost a gantry shape, and mounting plates 62b and 62b' protruding forward and backward from the upper portions of and nearly perpendicularly to both side opposing walls of the main portion 62a. Of the side walls opposing each other of the main portion 62a, the front wall is formed slightly higher than the rear one.

The chucking member 61 configured as described above is disposed such that the circular plate member 64 thereof faces the turntable 32 of the first base 4. The mounting plates 62b and 62b' of the mounting member 62 are screwed to the second base 5.

In the chucking member 61 supported at the second base 5, since the main portion 62a of the mounting member 62 has the side walls opposing each other and having different heights, the circular plate member 64 is supported with its front being slightly lowered when the second base 5 is level. This is for the purpose of preventing eccentricity of the optical disc 8 when the optical disc 8 is chucked, as described later. This point will be described in detail in explaining the operation of the first base 4 and the second base 5.

Cam gears 66R and 66L serve as a synchronization mechanism for synchronizing the operation of the first base 4 and the second base 5. Since these cam gears 66R and 66L have the same structure, only the cam gear 66R will be described here. Cam grooves 67R and 68R are formed on one surface of the cam gear 66R. The reason why these two cam grooves, 67R and 68R, are formed on one cam gear 66R is that one of them, cam groove 67R (hereinafter called a first cam groove), is used for the first base 4 and the other, cam groove 68R (hereinafter called a second cam groove), is used for the second base 5, as shown in FIG. 5. This embodiment uses the cam gears 66R and 66L as a synchronization mechanism for the first base 4 and the second base 5. The present invention does not limit use of other mechanisms. The first base 4 and the second base 5 may be connected to separate driving mechanisms which synchronize with each other.

The cam gear 66R is rotatably supported on the outside surface of a side wall of the chassis 3 at the front-end portion of the wall such that the cam grooves 67R and 68R face the side wall of the chassis 3. At least one of the cam gears 66R and 66L engages a gear of a driving mechanism (not shown in the figures) at its outer teeth.

The cam grooves 67R and 68R have a width slightly larger than the outside diameter of the ball bearings 29 and 29' mounted on the engagement shafts 25b and 25b', which protrude from the bases 4 and 5, respectively.

The ball bearings 29 and 29' mounted on the engagement shafts 25b and 25b' engage the cam grooves 67R and 68R, respectively. As the cam gear 66R rotates, the ball bearings 29 and 29' roll up and down, respectively, along the cam grooves 67R and 68R, swinging the first base 4 and the second base 5, respectively.

The first cam groove 67R and the second cam groove 68R are formed as shown in FIG. 5.

The first cam groove 67R has a flat, nearly U-shaped figure, and comprises one end portion 67Ra (hereinafter called an open zone) which is an arc belt near the circumference of the cam gear 66R with its center being at the center of the cam gear 66R, an intermediate portion 67Rb (hereinafter called a move zone) which is a straight belt extending from the circumference of the cam gear 66R to the inside, and the other end portion 67Rc (hereinafter called a closed zone) which is an arc belt near the center of the cam gear 66R with its center being the center of the cam gear 66R.

The second cam groove 68R has a flat, nearly J-shaped figure, and comprises one end portion 68Ra (hereinafter called an open zone) which is an arc belt near the circumference of the cam gear 66R with its center being at the center of the cam gear 66R and is disposed at the position almost 180 degrees shifted from the open zone 67Ra of the first cam groove 67R, an intermediate portion 68Rb (hereinafter called a move zone) which is a straight belt and extends from the circumference of the cam gear 66R to the inside, and the other end portion 68Rc (hereinafter called a closed zone) which is an arc belt near the center of the cam gear 66R with its center being the center of the cam gear 66R.

At the end portion of the open zone 68Ra of the second cam groove 68R, a notch portion 68Rd opening to the outside of the cam gear 66R is formed.

Figure 23:
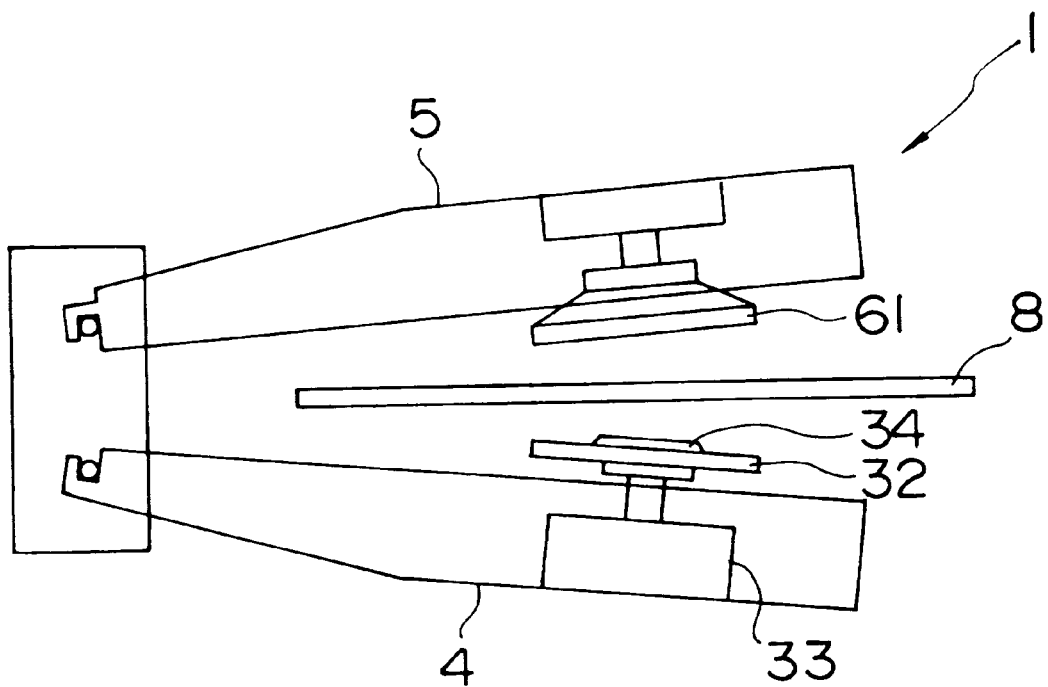
FIG. 23, as well as FIGS. 24 to 26, shows the operation of the bases in outline.
Figure 27:
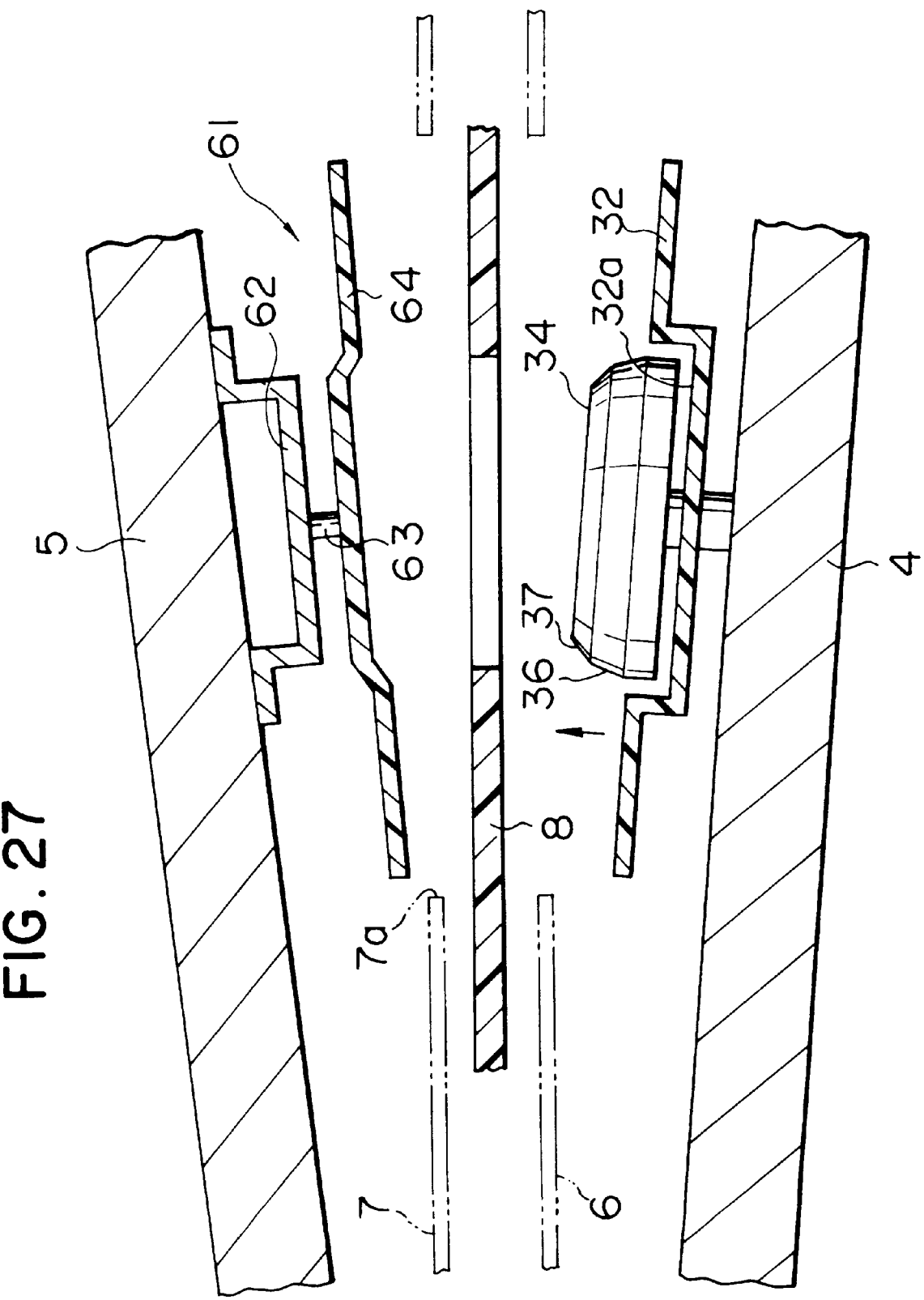
FIG. 27, as well as FIGS. 28 to 31 in sequence, shows in outline a condition in which the optical disc is chucked.

FIGS. 5, 23, and 27 illustrate a condition in which the first base 4 is swung downward against the chassis 3 and the second base 5 is swung upward against the chassis 3 (hereinafter this condition is called the open condition). The disc cartridge 6 can be drawn from or inserted into the disc player 1.

Figure 26:
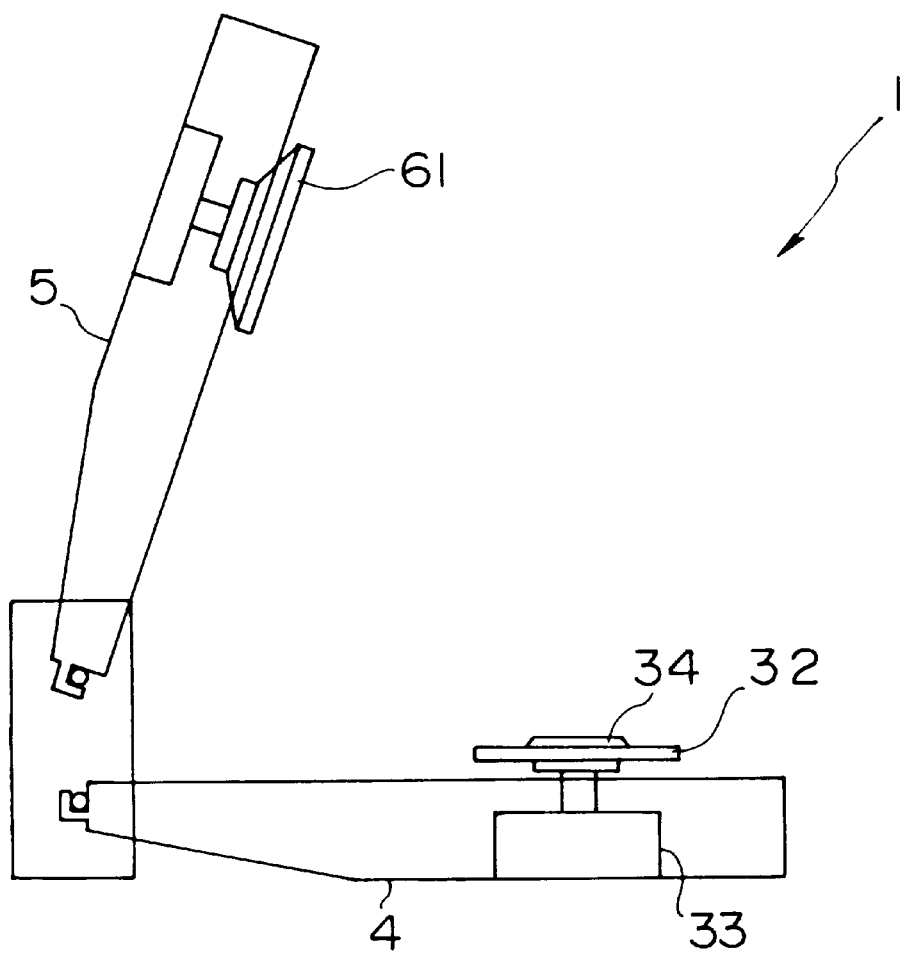
FIG. 26 is a side view showing a condition in which the second base is swung upward.

In this condition, the ball bearing 29' of the second base 5 can be taken out upward from the notch portion 68Rd of the second cam groove 68R. This allows the second base 5 to swing further upward as shown in FIG. 26, facilitating inspection and maintenance of the inside of the disc player 1.

When the cam gear 66R is swung clockwise as viewed in FIG. 5, from the condition shown in FIG. 5, the ball bearings 29 and 29' engaged with the cam grooves 67R and 68R roll within the open zones 67Ra and 68Ra, respectively. When both ball bearings 29 and 29' are located within the open zones 67Ra and 68Ra, both bases 4 and 5 do not swing up and down.

The disc cartridge 6 is loaded in the condition shown in FIG. 5, although the cartridge is not shown in the figure.

Figure 6:
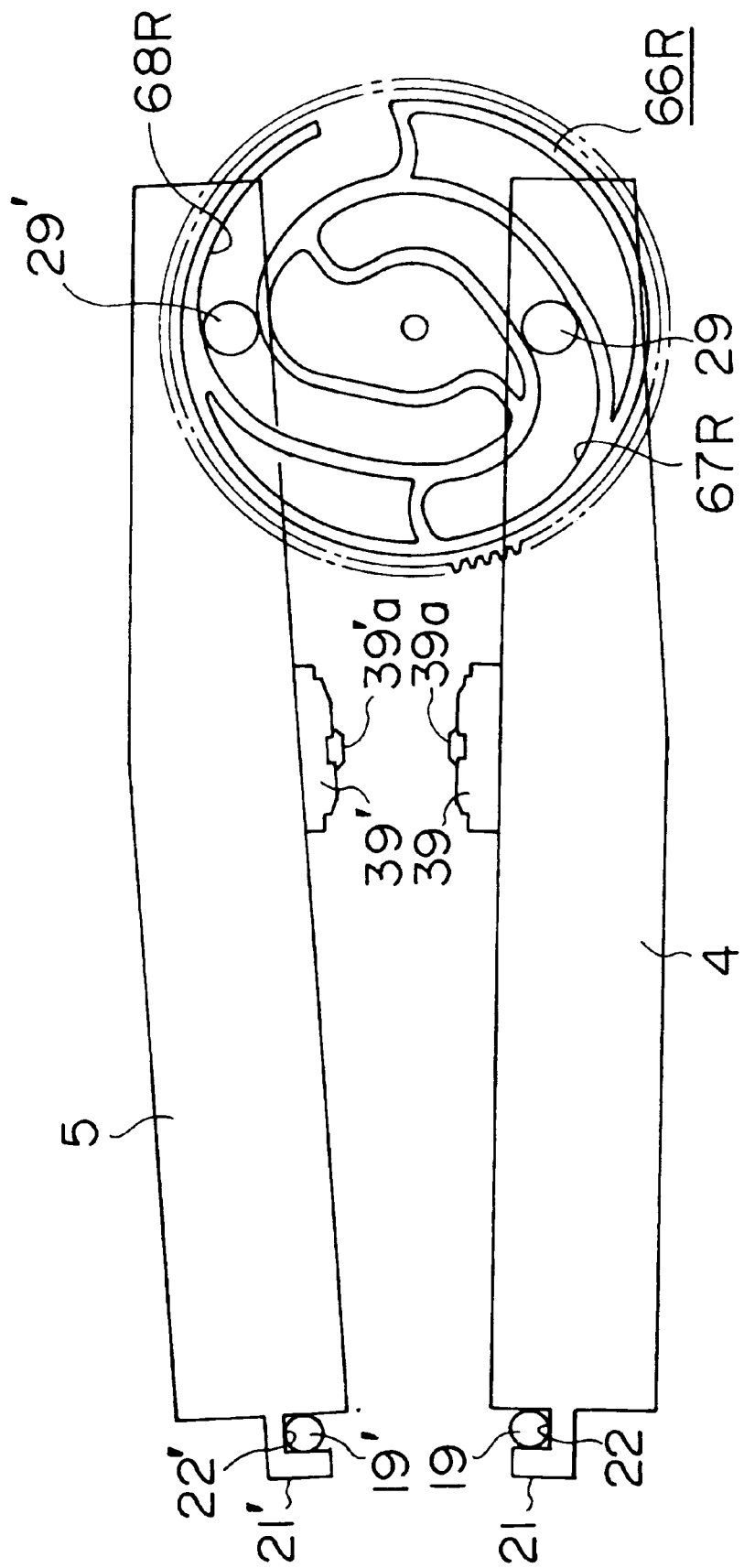
FIG. 6 is an outlined side view illustrating a condition in which a first base is slightly raised by slightly rotating the cam gear clockwise from the condition shown in FIG. 5.
Figure 28:
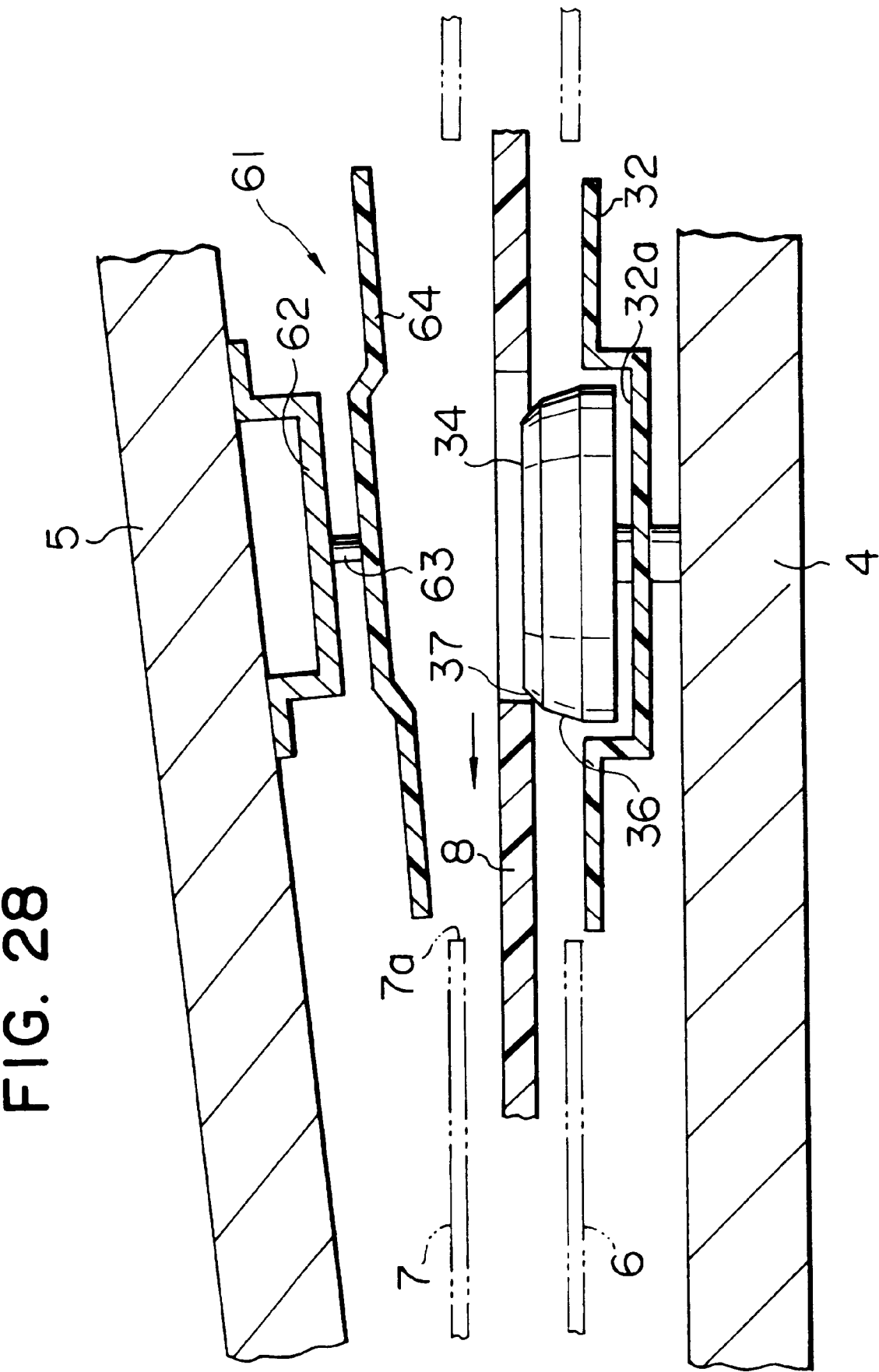
FIG. 28 is a vertical, longitudinal, central cross section showing a condition in which the optical disc is to be centered.

Because the open zone 67Ra of the first cam groove 67R is shorter than the open zone 68Ra of the second cam groove 68R, the ball bearing 29 of the first base 4 reaches the move zone 67Rb of the cam groove 67R earlier than the ball bearing 29' of the second base 5 reaches the open zone 68Rb of the cam groove 68R, swinging the first base 4 earlier than the second base 5, as shown in FIGS. 6 and 28.

Figure 7:
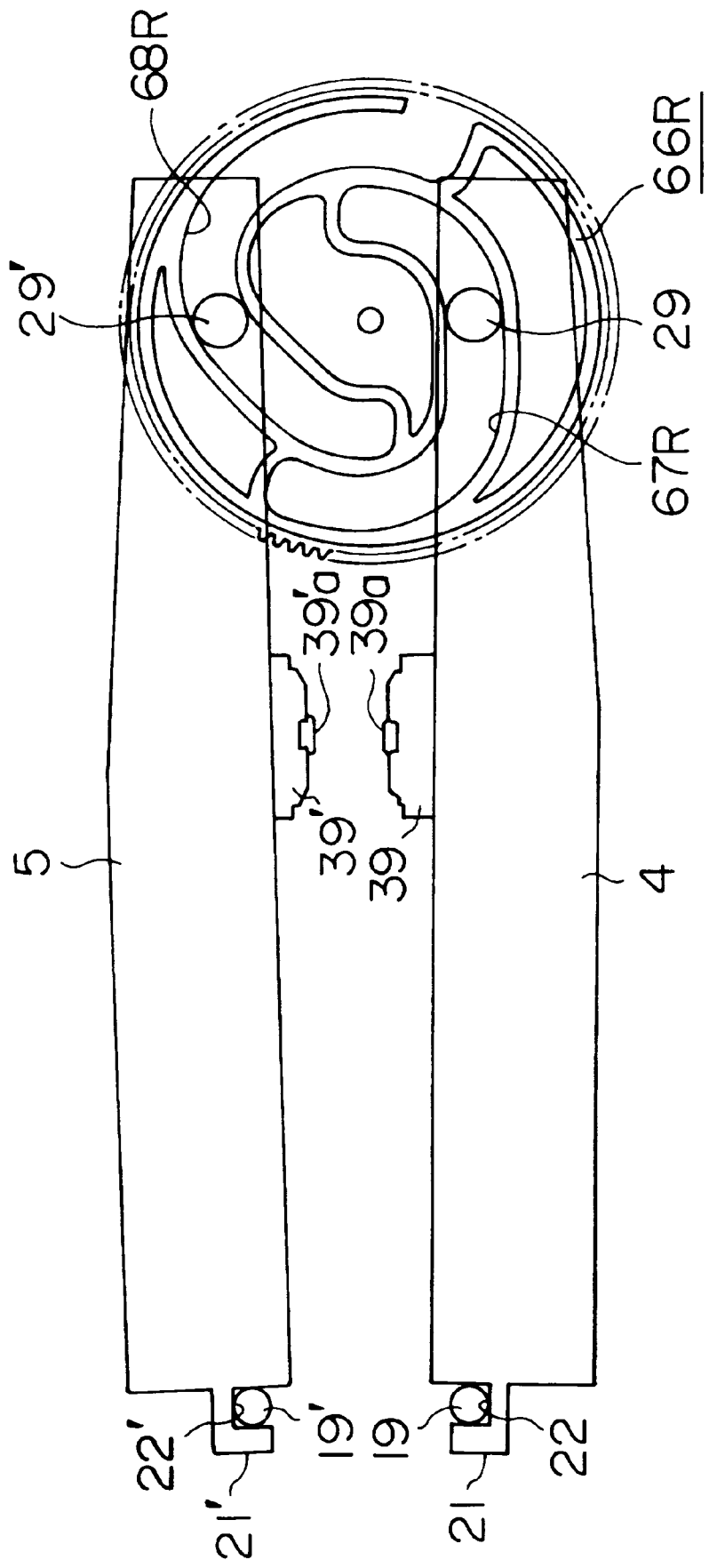
FIG. 7 is an outlined side view illustrating a condition in which the first base is further raised and the second base is slightly lowered by slightly rotating the cam gear clockwise from the condition shown in FIG. 6.

When the cam gear 66R rotates further, the ball bearing 29' of the second base 5 reaches its move zone 68Rb, and the second base 5 starts swinging, as shown in FIG. 7.

Figure 8:
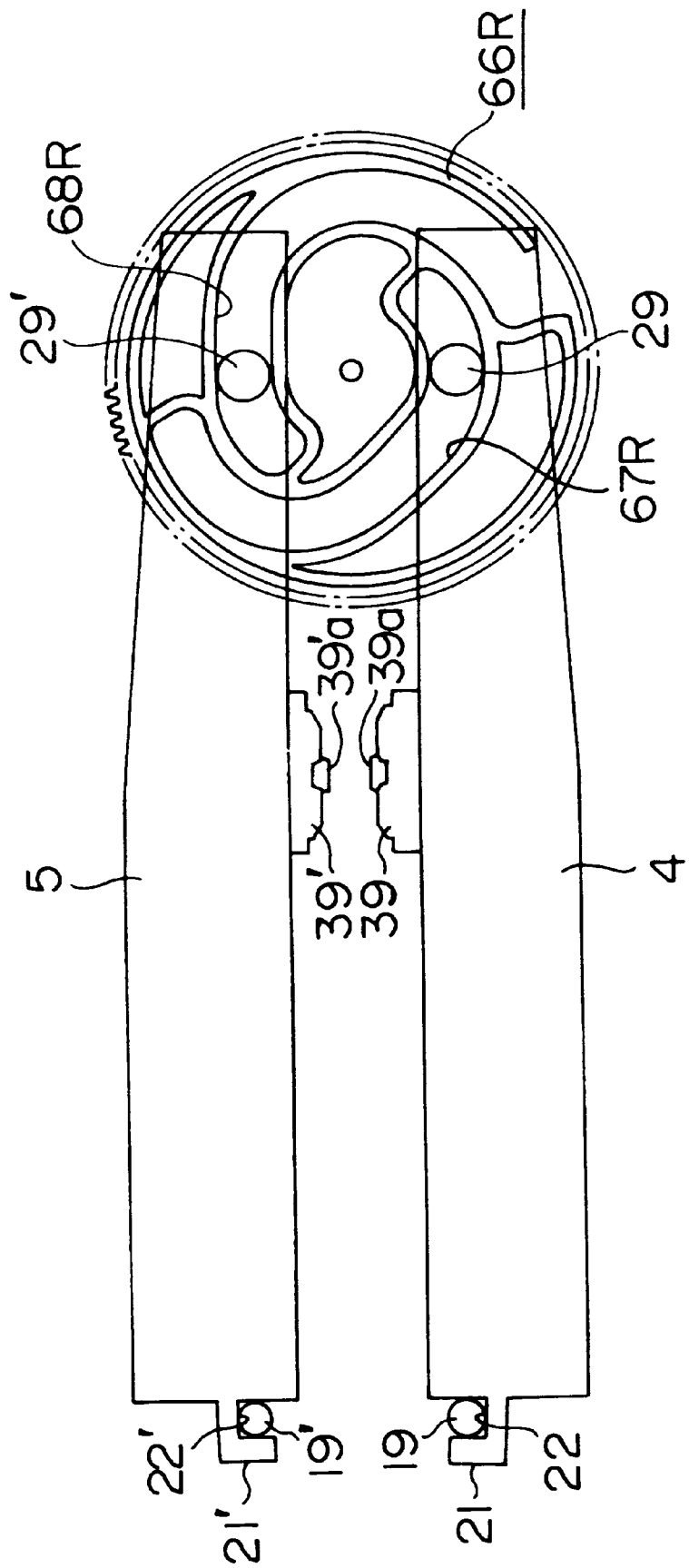
FIG. 8 is an outlined side view illustrating a condition in which the first base is positioned in its chucking condition and the second base is further lowered by slightly rotating the cam gear clockwise from the condition shown in FIG. 7.
Figure 24:
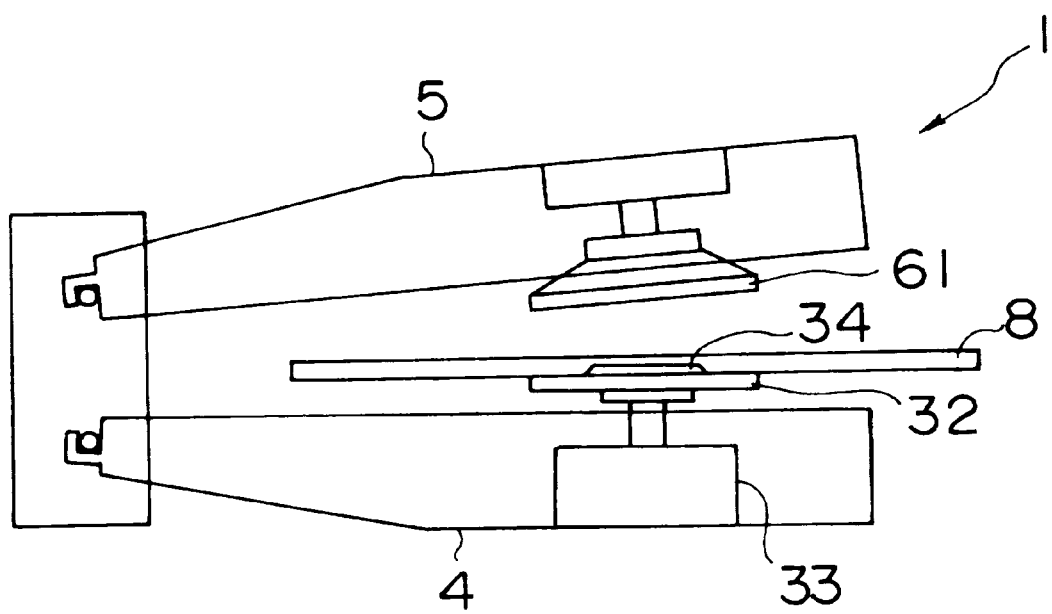
FIG. 24 is a side view showing a condition in which the first base reaches its chucking condition.
Figure 29:
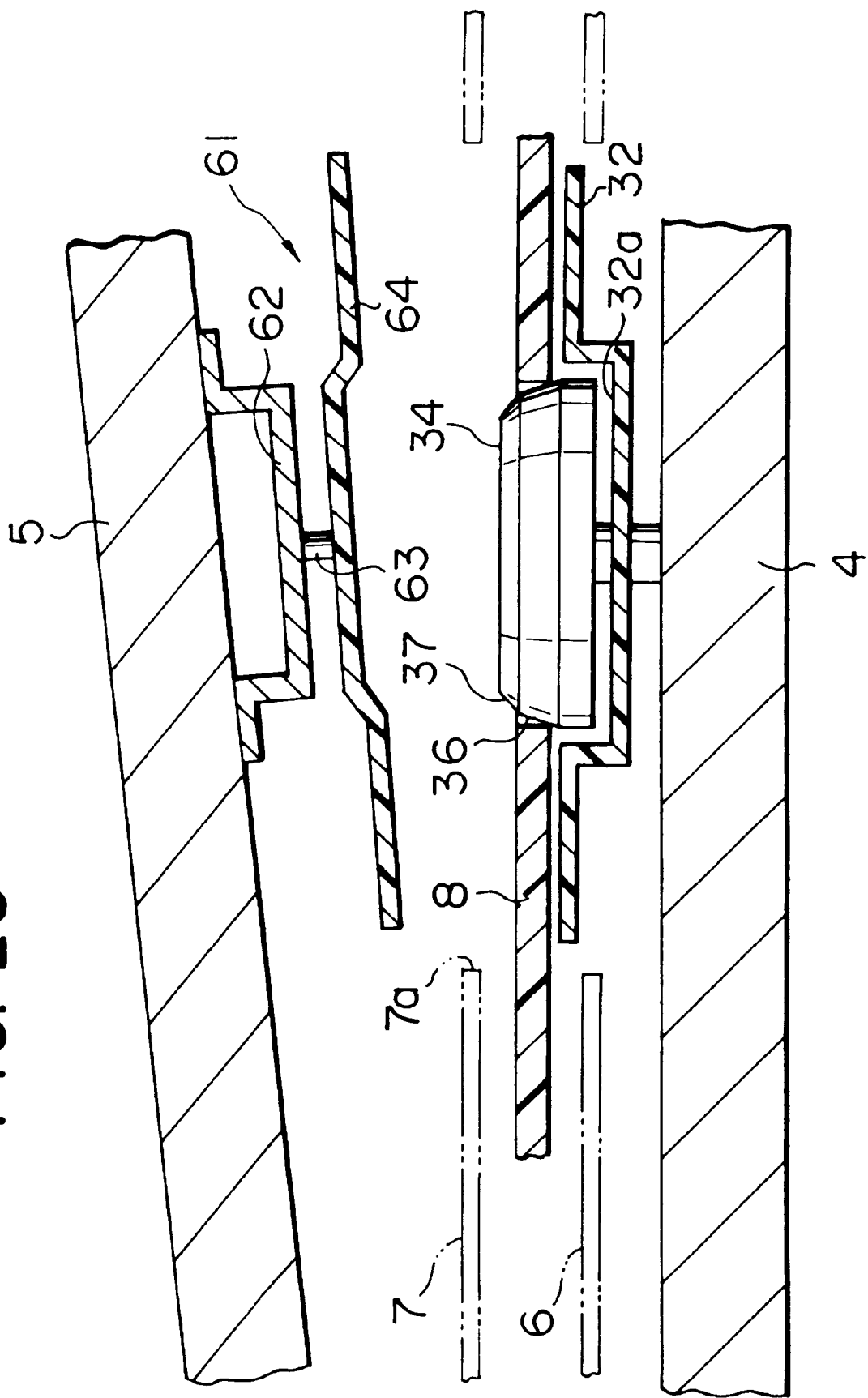
FIG. 29 is a vertical, longitudinal, central cross section showing a condition in which the optical disc has been centered.

Since as the cam gear 66R turns clockwise the end of the move zone 67Rb of the first cam groove 67R is reached earlier than that of the move zone 68Rb of the second cam groove 68, the first base 4 reaches its chucking position earlier than the second base 5, as shown in FIGS. 8, 24, and 29.

As shown in FIG. 29, the optical disc 8 of the loaded disc cartridge 6 is placed on the tapered surface 36 of the centering guide 34 in this condition. To state this more precisely, the inner peripheral edge of the optical disc 8 is placed on the tapered surface 36 of the centering guide 34.

If the optical disc 8 is shifted slightly forward against the centering guide 34 as shown in FIG. 27, for example, since the optical disc 8 first touches the guide surface 37 of the centering guide 34 at its rear-end portion of the inner peripheral edge, the inner peripheral edge slips down the buffed guide surface 37 to fit on the taper surface 36 of the centering guide 34, centering the optical disc 8 as shown in FIG. 29.

Figure 9:
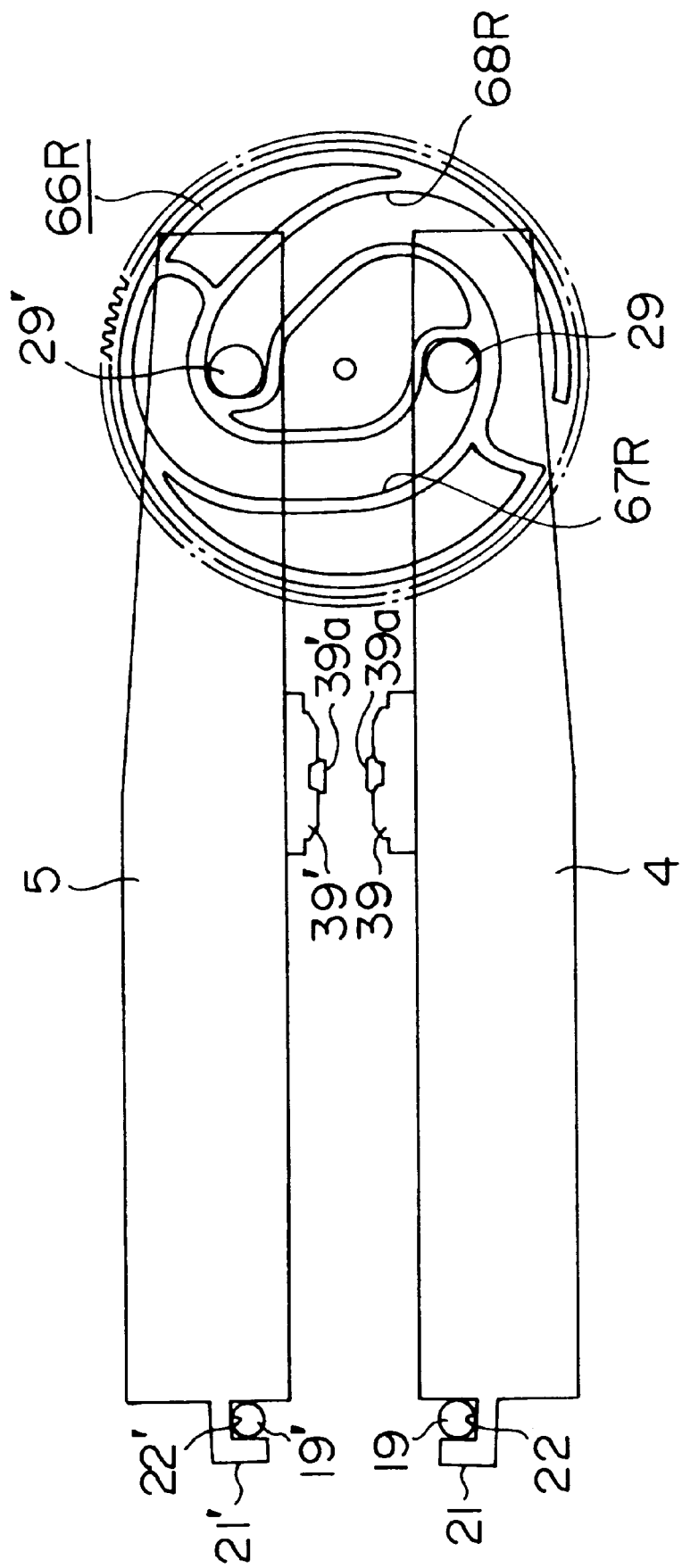
FIG. 9 is an outlined side view illustrating a condition in which the second base is also positioned in its chucking position by slightly rotating the cam gear clockwise from the condition shown in FIG. 8.
Figure 25:
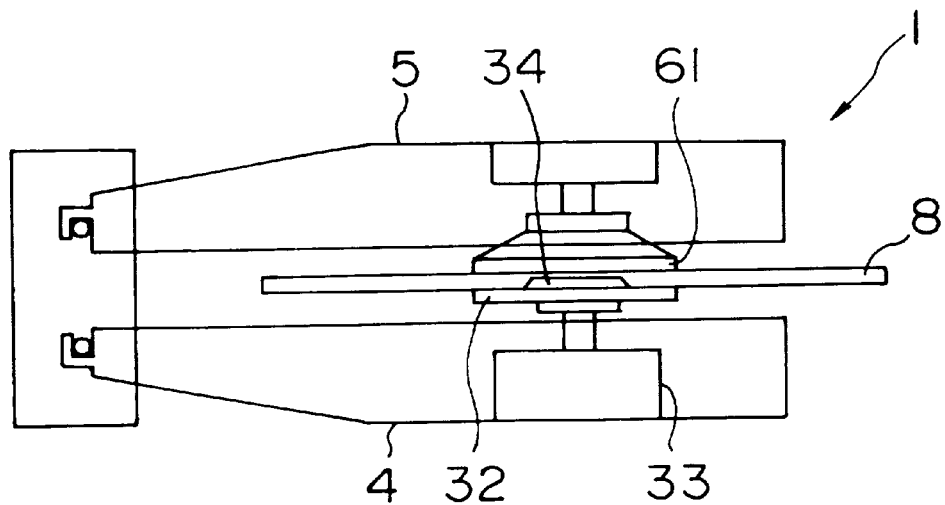
FIG. 25 is a side view showing the chucking condition.
Figure 31:
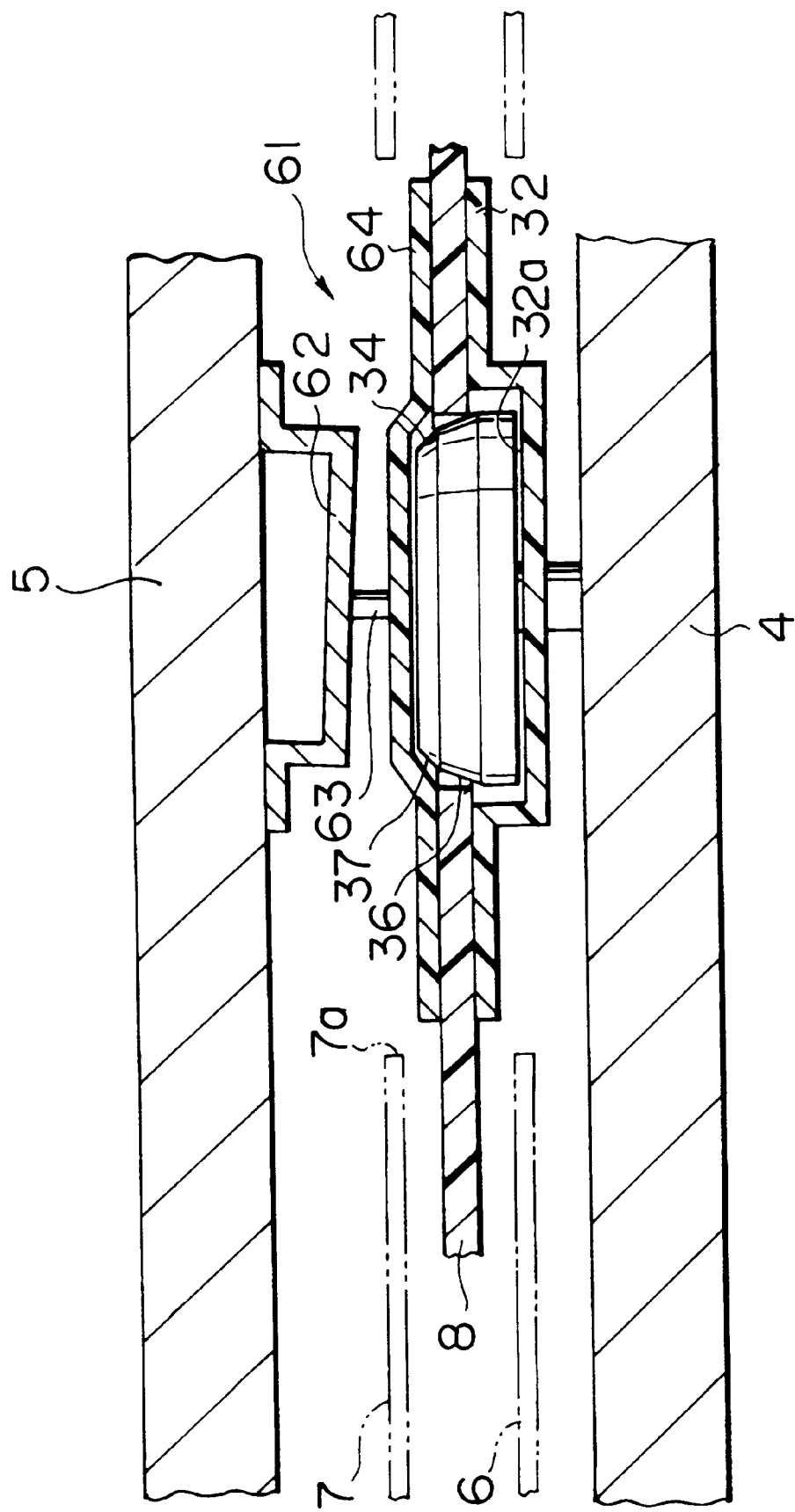
FIG. 31 is a vertical, longitudinal, central cross section showing a condition in which the optical disc has been chucked.

When the cam gear 66R swings further, the ball bearing 29' of the second base 5 reaches the close zone 68Rc. The optical disc 8 is chucked as shown in FIGS. 9, 25, and 31.

Figure 30:
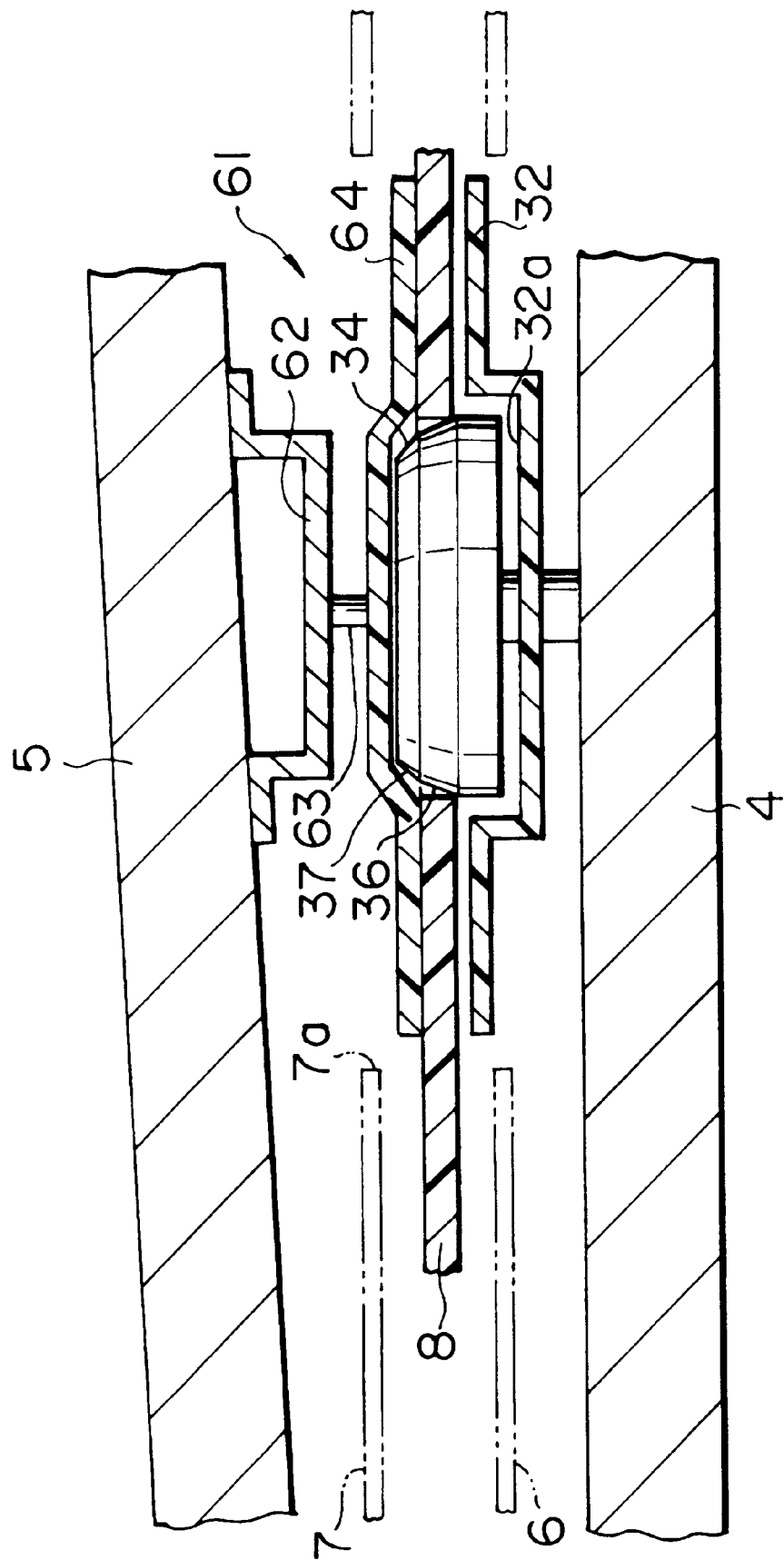
FIG. 30 is a vertical, longitudinal, central cross section showing a condition in which the chucking member touches the optical disc.

Immediately before the ball bearing 29' of the second base 5 reaches its close zone 68Rc, the circular member 64 of the chucking member 61 touches the upper surface of the optical disc 8. Immediately before touching the upper surface, the circular member 64 becomes parallel to the optical disc 8 as shown in FIG. 30.

As described above, this is because the circular member 64 is supported with its front portion downward against the second base 5 by changing the heights of the opposing side walls of the main portion 62a of the mounting member 62 for the chucking member 61. Hence, the circular member 64 touches the optical disc 8 with its surface.

In the condition in which the circular plate 64 touches the optical disc 8 with its surface, when the second base 5 swings further, the circular member 64 moves the centering guide 34 downward against the pushing force of the coil spring 38 while it presses the optical disc 8 downward. The lower surface of the optical disc 8 touches the upper surface of the turntable 32 and the optical disc 8 is chucked, as shown in FIG. 31.

The second base 5 is swung at this time. Since the second base 5 moves a little, the optical disc 8 is moved downward precisely and the centering condition of the optical disc 8 does not change.

When the optical disc 8 is chucked, the second base 5 is level. The main portion 62a of the mounting member 62 is slightly slanted, and the support shaft 63 is not perpendicular to the main portion 62a of the mounting member 62. Since the support shaft 63 is rockably supported against the main portion 62a of the mounting member 62, any problems, such as irregular rotation, do not occur when the circular member 64 rotates as the turntable 32 rotates.

Division wall members 69L and 69R are rectangular-block-shaped members mounted such that they engage the frame member 18 mounted at the rear wall 3a of the chassis 3. They are disposed at the positions corresponding to the rear-end portions of the inside walls 30 and 30' of the bases 4 and 5, on the frame member 18. They protrude more forward than the front-end edge of the frame member 18. The front-end surfaces of the division wall members 69R and 69L touch the rear end of the loaded disc cartridge 6, as shown in FIG. 4.

When the disc cartridge 6 is loaded and the optical disc 8 is chucked (more precisely, when the bases 4 and 5 are in the chucking condition), the inside walls 30 and 30' of the first base 4 and the second base 5, and the sealing members 31 and 31' engaged with the center portion of the front wall contact tightly with the upper and lower surfaces of the disc cartridge 6. The sealing members 31 and 31' engaged with the rear wall of the bases 4 and 5 also contact tightly with the upper and lower surfaces of the frame member 18. In addition, of the sealing members 31 and 31' engaged with the inside walls 30 and 30', the rear-end portions contact tightly with the upper and lower surfaces of the division wall members 69L and 69R, as shown in FIG. 10. Hence, a closed space 70 by which the disc cartridge 6 is sandwiched from above and below is formed in the disc player 1.

When the disc cartridge 6 is loaded and the optical disc 8 is chucked, the rear-end edge of the disc cartridge 6 contacts tightly with the front-end surfaces of the division wall members 69L and 69R, and the sealing members 31 and 31' engaged on the rear walls of the bases 4 and 5 contact tightly with the upper and lower surfaces of the frame member 18. In addition, of the sealing members 31 and 31' engaged with the inside walls 30 and 30', the rear-end portions contact tightly with the upper and lower surfaces of the division wall members 69L and 69R. Hence the rear space 71 is formed.

At the same time, below the disc cartridge 6, a space (hereinafter called the lower-side space) 72d is formed which is enclosed by the bottom surface of the first base 4, the inside wall 30, the sealing member 31, and the lower surface of the disc cartridge 6. See FIG. 10. Above the disc cartridge 6, a space (hereinafter called an upper-side space) 72u is formed which is enclosed by the bottom surface of the second base 5, the inside wall 30', the sealing member 31', and the upper surface of the disc cartridge 6. These spaces, the lower-side space 72d and the upper-side space 72u, are connected to the rear space 71 to form the closed space 70.

With this configuration, when the disc cartridge 6 is loaded and the optical disc 8 is chucked, since the optical pickup 39 and the optical disc 8 are placed in the closed space 70 and shielded from outside air, air having dust does not enter the closed space 70 even when the optical disc 8 rotates. This means that dust does not adhere to the optical pickup 39 and the optical disc 8.

The closed space 70 is connected to the outside of the disc player 1 through the duct 10 at the air inlet 15 of the chassis 3. It is also connected to the outside of the disc player 1 through the ventilation windows 60 and 60' of the bases 4 and 5, as shown in FIG. 10.

In the closed space 70, cleaned air flows through the duct 10 with the rotation of the fan 12 into the rear space 71. The air flows through the lower-side space 72d and the upper-side space 72u, and is exhausted from the ventilation windows 60 and 60' with the fans 59 and 59' of the bases 4 and 5.

When the cleaned air flows through the closed space 70, it cools the optical pickup, electronic components, optical disc 8, and other parts.

When the bases 4 and 5 are in an open condition, the closed space 70 is not formed. Cleaned air flows through the duct 10 with the rotation of the fan 12 into the space between the two bases 4 and 5 from the rear, and is exhausted from the front surface of the disc player 1, as shown in FIG. 11.

When the bases 4 and 5 remain open, air having dust may enter from the front of the disc player 1. With the flow of the above-described cleaned air, air having dust is prevented from entering from the front of the disc player 1, and dust is prevented from adhering to the objective lens 39a of the optical pickup 39 or other components.

As it is clearly understood from the above description, the disc player according to the present invention comprises the two bases rotatably supported with the rotation axes disposed at the same side against the chassis such that the surfaces of the bases 4 and 5 approach and leave from each other; the turntable provided for the first base; and the chucking member provided for the second base. The optical disc is chucked when the first base and the second base approach and oppose each other. The synchronization mechanism is provided for swinging the first base and the second base in synchronization with each other, and the first base and the second base reach their chucking positions at different times. The centering mechanism for centering the optical disc is provided for the turntable or the chucking member of a base which reaches the chucking position earlier than the other one. When the base reaches its chucking position, the centering of the optical disc along the surface direction is performed.

Therefore, according to the present invention, since the first base and the second base are rotatably supported with their axes of rotation at the same side of the bases, and they swing in synchronization with each other with the synchronization mechanism, the optical disc can be stored in the chassis just by moving it horizontally, facilitating the chucking mechanism.

According to the present invention, the optical pickup does not move if the disc apparatus is moved after the power to the disc player is shut down for some reason during its operation, for example, by an attempt to carry the disc apparatus without knowing that it is in operation during a read operation of an optical disc. This is because the optical pickup is moved to the inner peripheral side of the optical disc and locked at that position when the power is turned off. Therefore, damage is prevented, such as errors in the precision of optical components and breakage of the optical pickup or members which enable the optical pickup to move freely. In addition, even if when carrying the disc player vibrations occur which substantially deform the optical disc, the outer peripheral portion of the optical disc does not touch the optical pickup. Therefore, the optical pickup is not scratched.

Since according to the present invention the optical pickup moves to the inner peripheral side of the optical disc and is locked at that position as the optical disc is released from the chucking condition, the optical pickup is already located at the reference position when the optical disc is chucked the next time, thus reducing the access time for the optical disc.

Since the pressing member which presses the moving table for the optical pickup from the outer peripheral side of the optical disc is used in common in the first moving mechanism and the second moving mechanism, according to the present invention, the number of the used components and the cost are reduced, also enabling the mechanisms to be made compact.

According to the present invention, when the disc cartridge is being loaded or after it is loaded, since the spaces enclosed by the sealing member are formed between the bases and the upper and lower surfaces of the disc cartridge, and the spaces are connected by the rear space which is formed when the disc cartridge is being loaded or after it is loaded, to form the closed space, the optical pickup and the optical disc can be positioned in the closed space when the optical disc is recorded or played back. With this operation, the optical pickup and the optical disc are not exposed to air having dust, thus preventing dust from adhering to the optical pickup and the optical disc.

The above embodiment uses the return lever as a member for pressing the moving table which serves as moving means for moving the optical pickup. The present invention does not limit the use of other mechanisms. The moving table may be moved by catching it with a link or other member.

In the above embodiment, the present invention applies to a disc player which uses a disc cartridge having a case for storing an optical disc. The present invention does not, however, limit applications only to such a disc player. It can be applied to disc players which use a laser disc or a compact disc itself.

In the above embodiment, a disc player which uses a double-sided optical disc is described. The present invention does not, however, limit the use of other disc players. It can be applied to a disc player which uses a single-sided optical disc.

The centering guide disposed on the turntable is used as a centering mechanism for an optical disc in the above-described embodiment. The present invention does not, however, limit the use of other mechanism. The centering guide may be disposed on the chucking member. In that case, the base on which the chucking member is disposed is placed at the lower side of the two bases.

The present invention does not, however, limit applications to a disc player having optical pickups each of which faces a surface of a disc. It can be applied to a disc player having plural optical pickups which oppose one surface or both surfaces of an optical disc.

Specific shapes and configurations described in the above embodiment indicate just an example which embodies the present invention. These descriptions do not limit the technical scope of the present invention.

What is claimed is:

1. A disc driving apparatus comprising:

a chassis;

a first base provided to rotate about a first shaft supported by the chassis between a first position for releasing a disc-shaped recording medium and a second position for chucking said disc-shaped recording medium;

a second base provided to rotate between a first position for releasing said disc-shaped recording medium and a second position for chucking said disc-shaped recording medium about a second shaft parallel to said first shaft which is supported by the chassis and provided at the same side of the chassis as said first shaft;

first member provided for one of said first base and said second base, to which driving power for rotating said disc-shaped recording medium is given;

a second member provided for the other one of said first base and said second base, for connecting said disc-shaped recording medium and said first member such that said disc-shaped recording medium rotates integrally with said first member; and base moving means for moving both said first base and said second base between said first positions and said second positions;

wherein said base moving means comprises:

a cam member having two grooves;

a first engagement shaft provided for said first base, for engaging with one of said two grooves on said cam member; and a second engagement shaft provided for said second base, for engaging with the other one of said two grooves on said cam member, and wherein the first engagement shaft and the second engagement shaft are parallel to each other and located on opposite sides of the disc-shaped recording medium.

2. A disc driving apparatus according to claim 1, further comprising centering means provided on one of said first member or said second member, for centering said disc-shaped recording medium against said first member or said second member, wherein said base moving means moves said first base and said second base such that one of said first base and said second base provided with said centering means reaches its second position from its first position earlier than the other of said first base and said second base when said first base and said second base are moved from said first positions to said second positions.

3. A disc driving apparatus according to claim 2, wherein said centering means includes a circular member having a taper portion which is engagable with a hole provided at the center of said disc-shaped recording medium.

4. A disc driving apparatus according to claim 1, wherein said two grooves on said cam member have different shapes.

5. A disc driving apparatus according to claim 1, further comprising:

a pickup provided movably in the radial direction of said disc-shaped recording medium for said first base or said second base, for accessing said disc-shaped recording medium;

actuating means which is operative in response to the turning off of the power;

pickup moving means for moving said pickup in the radial direction of said disc-shaped recording medium according to the operation of said actuating means; and locking means for locking the movement of said pickup which has been moved by said pickup moving means, according to the operation of said actuating means.

6. A disc driving apparatus according to claim 5, wherein said first base is provided at the lower side and said second base is provided at the upper side relative to the disc-shaped recording medium, said pickup moving means moves said pickup toward the inner direction of said disc-shaped recording medium according to the operation of said actuating means, and said locking means locks the movement of said pickup at the inner side of said disc-shaped recording medium.

7. A disc driving apparatus according to claim 1, wherein said first base is disposed lower than said second base, further comprising:
 a pickup provided movably in the radial direction of said disc-shaped recording medium for said first base or said second base, for accessing said disc-shaped recording medium;
 pickup moving means for moving said pickup in the inner direction of said disc-shaped recording medium integrally with the movement of said first base and said second base from said first positions to said second positions; and
 locking means for locking the movement of said pickup at the inner side of said disc-shaped recording medium.

8. A disc driving apparatus according to claim 7, further comprising actuating means which is operative in response to the tuning off of the power, wherein said pickup moving means moves said pickup in the inner direction of said disc-shaped recording medium integrally with the operation of said actuating means.

9. A disc driving apparatus according to claim 1, wherein said disc-shaped recording medium is inserted into a disc cartridge having opening portions and a shutter opening and closing in front of said opening portions, and said first base and said second base contact with the corresponding surfaces of said disc cartridge at said second positions and further comprise a sealing member which shields at least said opening portions of said disc cartridge from the outside.

10. A disc driving apparatus according to claim 9, further comprising a dust-proof filter and a fan for sending air passing through said dust-proof filter to the space shielded against the outside by said sealing member.

11. A disc driving apparatus according to claim 1, wherein said first member is a turntable and said second member is a chucking member.

12. A disc driving apparatus comprising:
 a pickup provided movably in the radial direction of a disc-shaped recording medium for accessing said disc-shaped recording medium;
 chucking means for chucking said disc-shaped recording medium;
 pickup moving means for moving said pickup in the radial direction to an inner peripheral side of said disc-shaped recording medium in interlock with the release of chucking by said chucking means;
 locking means for locking the movement of said pickup which has been moved by said pickup moving means at the inner peripheral side of the disc-shaped recording medium;
 a chassis;
 a first base provided to rotate about a first, level shaft between a first position for releasing a disc-shaped recording medium and a second position for chucking said disc-shaped recording medium;
 a second base provided, above said first base, to rotate between a first position for releasing said disc-shaped recording medium and a second position for chucking said disc-shaped recording medium about a second shaft parallel to said first shaft and provided at the same side of said chassis as said first shaft; and
 base moving means for moving said first base and said second base between said first positions and said second position;
 wherein said base moving means comprises:
  a cam member having two grooves;
  a first engagement shaft provided for said first base, for engaging with one of said two grooves on said cam member; and
  a second engagement shaft provided for said second base, for engaging with the other one of said two grooves on said cam member, and wherein the first engagement shaft and the second engagement shaft are parallel to each other and located on opposite sides of the disc-shaped recording medium wherein said chucking means comprises:
  a first member provided for said first base, to which driving power for rotating said disc-shaped recording medium is given; and
  a second member provided for said second base, for connecting said disc-shaped recording medium and said first member such that said disc-shaped record member rotates integrally with said first member, wherein said pickup moving means moves said pickup toward the inner direction of said disc-shaped recording medium, and said locking means locks said pickup moving means at the inner side of said disc-shaped recording medium.

* * * * *

UNITED STATES PATENT AND TRADEMARK OFFICE
CERTIFICATE OF CORRECTION

PATENT NO.: 5,898,657
DATED: April 27, 1999
INVENTOR(S): EIICHI HIRATA ET AL.

It is certified that errors appear in the above-identified patent and that said Letters Patent is hereby corrected as shown below:

In Col. 20, line 18, --a-- should be inserted before "first member".

In Col. 21, line 29, "tuning" should be --turning--.

Signed and Sealed this

Seventh Day of September, 1999

Attest:

Q. TODD DICKINSON

Attesting Officer

Acting Commissioner of Patents and Trademarks